United States Patent
Iwase et al.

(10) Patent No.: US 12,191,471 B2
(45) Date of Patent: Jan. 7, 2025

(54) METHOD OF MANUFACTURING FORMED BODY FOR ELECTRODE

(71) Applicant: FUJIFILM CORPORATION, Tokyo (JP)

(72) Inventors: Eijiro Iwase, Kanagawa (JP); Akihito Fukunaga, Kanagawa (JP); Koji Tonohara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 575 days.

(21) Appl. No.: 17/525,976

(22) Filed: Nov. 15, 2021

(65) Prior Publication Data

US 2022/0077447 A1 Mar. 10, 2022

Related U.S. Application Data

(63) Continuation of application No. PCT/JP2020/025350, filed on Jun. 26, 2020.

(30) Foreign Application Priority Data

Jun. 28, 2019 (JP) .................................. 2019-122367

(51) Int. Cl.
  *H01M 4/04* (2006.01)
(52) U.S. Cl.
  CPC ....... *H01M 4/0433* (2013.01); *H01M 4/0435* (2013.01)
(58) Field of Classification Search
  CPC .................................................. H01M 4/0433
  See application file for complete search history.

(56) References Cited

U.S. PATENT DOCUMENTS

| 10,964,969 B2 * | 3/2021 | Lee .......................... H01M 4/04 |
| 11,211,596 B2 * | 12/2021 | Suenaga ................. H01M 4/62 |

(Continued)

FOREIGN PATENT DOCUMENTS

| CN | 102694149 A | 9/2012 |
| CN | 107735887 A | 2/2018 |

(Continued)

OTHER PUBLICATIONS

English language translation of the following: Office action dated Mar. 14, 2023 from the JPO in a Japanese patent application No. 2021-527795 corresponding to the instant patent application. This office action translation is submitted now in order to supplement the understanding of the cited references which are being disclosed in the instant Information Disclosure Statement.

(Continued)

*Primary Examiner* — Amanda C. Walke
(74) *Attorney, Agent, or Firm* — SOLARIS Intellectual Property Group, PLLC

(57) ABSTRACT

The present disclosure provides a method of manufacturing a formed body for an electrode comprising in order: a step of preparing an electrode material containing an electrode active material; a step of supplying the electrode material to a forming mold which has a frame-shaped side wall portion defining a space portion accommodating the electrode material and has a first support placed on a bottom surface of the forming mold; a step of forming the electrode material along an internal shape of the forming mold; and a step of taking out the electrode material from the forming mold.

20 Claims, 5 Drawing Sheets

(56) References Cited

U.S. PATENT DOCUMENTS

| | | | |
|---|---|---|---|
| 2009/0087730 | A1 | 4/2009 | Kondo et al. |
| 2012/0225351 | A1 | 9/2012 | Kojima |
| 2018/0090748 | A1 | 3/2018 | Mochizuki et al. |
| 2018/0277901 | A1 | 9/2018 | Mochizuki et al. |
| 2019/0207253 | A1 | 7/2019 | Makino et al. |
| 2019/0326625 | A1 * | 10/2019 | Cheng ............... H01M 10/0525 |
| 2020/0136125 | A1 * | 4/2020 | Suenaga ............. H01M 4/0433 |

FOREIGN PATENT DOCUMENTS

| | | | |
|---|---|---|---|
| CN | 109690834 | A | 4/2019 |
| CN | 113517421 | A * | 10/2021 |
| JP | S59-103371 | U | 7/1984 |
| JP | S63-029445 | A | 2/1988 |
| JP | H04-67610 | A | 3/1992 |
| JP | 2000-277129 | A | 10/2000 |
| JP | 3743706 | B2 | 2/2006 |
| JP | 2009-064644 | A | 3/2009 |
| JP | 2014-037142 | A | 2/2014 |
| JP | 2015-068465 | A | 4/2015 |
| JP | 2015-170569 | A | 9/2015 |
| WO | 2011/064842 | A1 | 6/2011 |
| WO | 2017/104405 | A1 | 6/2017 |
| WO | WO-2018194163 | A1 * | 10/2018 .......... H01M 10/052 |

OTHER PUBLICATIONS

English language translation of the following: Office action dated Nov. 13, 2023 from the SIPO in a Chinese patent application No. 202080043929.6 corresponding to the instant patent application. This office action translation is submitted now in order to supplement the understanding of the cited references which are being disclosed in the instant Information Disclosure Statement.

English language translation of the following: Office action dated Sep. 27, 2022 from the JPO in a Japanese patent application No. 2021-527795 corresponding to the instant patent application. This office action translation is submitted now in order to supplement the understanding of the cited reference which is being disclosed in the instant Information Disclosure Statement.

Extended European Search Report dated Aug. 12, 2022, issued in corresponding EP Patent Application No. 20833182.7.

International Search Report issued in International Application No. PCT/JP2020/025350 on Aug. 4, 2020.

Written Opinion of the ISA issued in International Application No. PCT/JP2020/025350 on Aug. 4, 2020.

\* cited by examiner

METHOD OF MANUFACTURING FORMED BODY FOR ELECTRODE

CROSS-REFERENCE TO RELATED APPLICATION

This application is a continuation application of International Application No. PCT/JP2020/025350, filed Jun. 26, 2020, the disclosure of which is incorporated herein by reference in its entirety. Further, this application claims priority from Japanese Patent Application No. 2019-122367, filed Jun. 28, 2019, the disclosure of which is incorporated herein by reference in their entirety.

BACKGROUND OF THE INVENTION

1. Field of the Invention

The present disclosure relates to a method of manufacturing a formed body for an electrode.

2. Description of the Related Art

An electrolytic solution is usually used as an electrolyte contained in a battery such as a lithium ion battery. In recent years, from the viewpoint of safety (for example, prevention of liquid leakage), the development of an all-solid state battery that replaces an electrolytic solution with a solid electrolyte has been considered.

In the manufacturing of an electrode to be applied to the battery described above, a coating liquid containing an electrode material such as an active material and a solvent is usually used (for example, WO2017/104405A and JP3743706B).

In the manufacturing of a polarizable electrode of an electric double layer capacitor, a technology in which an activated carbon powder, carbon black, and a binder are kneaded in a dry manner, and a polarizable electrode is formed by rolling into a sheet has been known (for example, JP1992-67610A (JP-H04-67610A)).

SUMMARY OF THE INVENTION

In the method of forming an electrode using a coating liquid (for example, WO2017/104405A and JP3743706B), it is usually necessary to dry the coating liquid. In a case where the drying is not sufficiently performed, the solvent may remain in the electrode, and the battery performance (for example, discharge capacity and output characteristics) may thus be reduced. In particular, in an all-solid state battery, the amount of the solvent remaining in the electrode is preferably small.

In the method of forming an electrode without using a coating liquid (for example, JP1992-67610A (JP-H04-67610A)), an electrode to be obtained tends to have a non-uniform density distribution (that is, mass distribution), so that there is room for improvement in formability. Electrodes having a non-uniform density distribution may lead to poor battery performance. The above-described problem may occur not only in using a dry electrode material, but also in using a wet electrode material. In addition, the formability of the electrode tends to decrease as the number of components for forming the electrode is increased.

The present disclosure is contrived in view of the above circumstances.

An object of an embodiment of the present disclosure is to provide a method of manufacturing a formed body for an electrode, in which a formed body for an electrode having excellent formability can be obtained in a case where an electrode material having a low solvent content is formed.

The present disclosure includes the following aspects.

<1> A method of manufacturing a formed body for an electrode including in order: a step of preparing an electrode material containing an electrode active material; a step of supplying the electrode material to a forming mold which has a frame-shaped side wall portion defining a space portion accommodating the electrode material and has a first support placed on a bottom surface of the forming mold; a step of forming the electrode material along an internal shape of the forming mold; and a step of taking out the electrode material from the forming mold.

<2> The method of manufacturing a formed body for an electrode according to <1>, in which in the step of forming the electrode material, the electrode material and a forming member are brought into direct or indirect contact with each other to form the electrode material.

<3> The method of manufacturing a formed body for an electrode according to <1> or <2>, further including: a step of placing a second support on the electrode material supplied to the forming mold between the step of supplying the electrode material and the step of forming the electrode material.

<4> The method of manufacturing a formed body for an electrode according to <1> or <2>, further including: a step of placing a second support on the electrode material supplied to the forming mold between the step of forming the electrode material and the step of taking out the electrode material.

<5> The method of manufacturing a formed body for an electrode according to <1> or <2>, further including: a step of placing a second support on the electrode material supplied to the forming mold, in which the step of placing the second support and the step of forming the electrode material are simultaneously performed.

<6> The method of manufacturing a formed body for an electrode according to any one of <3> to <5>, in which the second support is a collector.

<7> The method of manufacturing a formed body for an electrode according to any one of <1> to <6>, further including: a step of placing the electrode material below the first support in a vertical direction by changing a positional relationship between the first support and the electrode material between the step of forming the electrode material and the step of taking out the electrode material.

<8> The method of manufacturing a formed body for an electrode according to any one of <1> to <7>, in which in the step of taking out the electrode material, the electrode material and the first support are taken out from the forming mold.

<9> The method of manufacturing a formed body for an electrode according to any one of <1> to <8>, further including: a step of pressurizing the electrode material between the step of forming the electrode material and the step of taking out the electrode material, or after the step of taking out the electrode material.

<10> The method of manufacturing a formed body for an electrode according to <9>, in which in the step of pressurizing the electrode material, the electrode material is pressurized in a stepwise manner using a plurality of rolls.

<11> The method of manufacturing a formed body for an electrode according to any one of <1> to <10>, in which the electrode material is supplied to the forming mold by jetting the electrode material from an outlet having an on-off mechanism controlling the supply of the electrode material.

<12> The method of manufacturing a formed body for an electrode according to <11>, in which the electrode material is supplied to the forming mold while the outlet and the forming mold are relatively moved.

<13> The method of manufacturing a formed body for an electrode according to any one of <1> to <12>, in which a content of a liquid component in the electrode material is 30 mass % or less with respect to a total mass of the electrode material.

<14> The method of manufacturing a formed body for an electrode according to any one of <1> to <13>, in which the electrode material contains a conductive auxiliary agent.

<15> The method of manufacturing a formed body for an electrode according to any one of <1> to <14>, in which the first support is a release material.

According to an embodiment of the present disclosure, it is possible to provide a method of manufacturing a formed body for an electrode, in which a formed body for an electrode having excellent formability can be obtained in a case where an electrode material having a low solvent content is formed.

Figure 2:
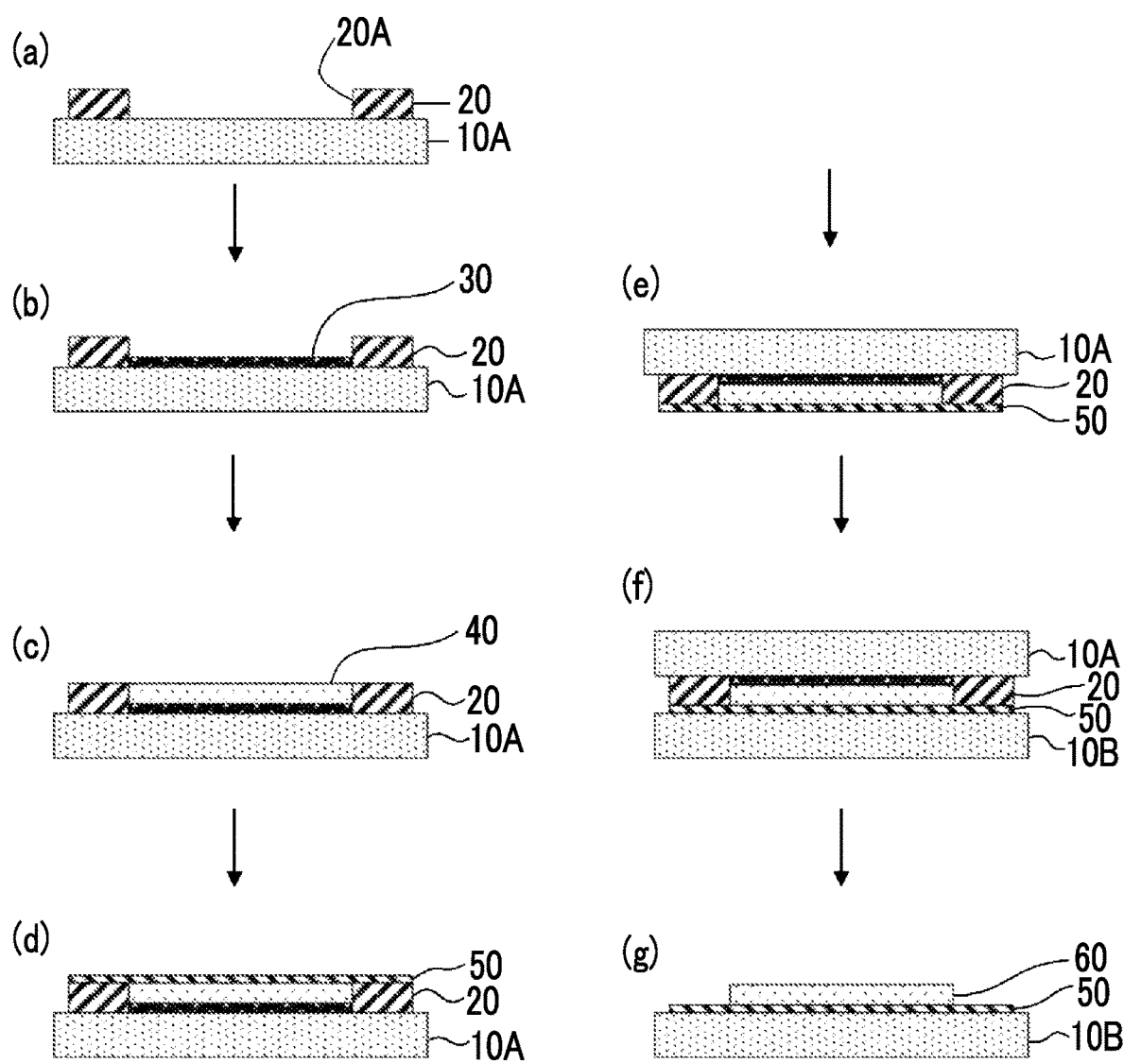

(a) to (g) of FIG. 2 show schematic cross-sectional views showing an example of the method of manufacturing a formed body for an electrode according to the present disclosure.

Figure 3:
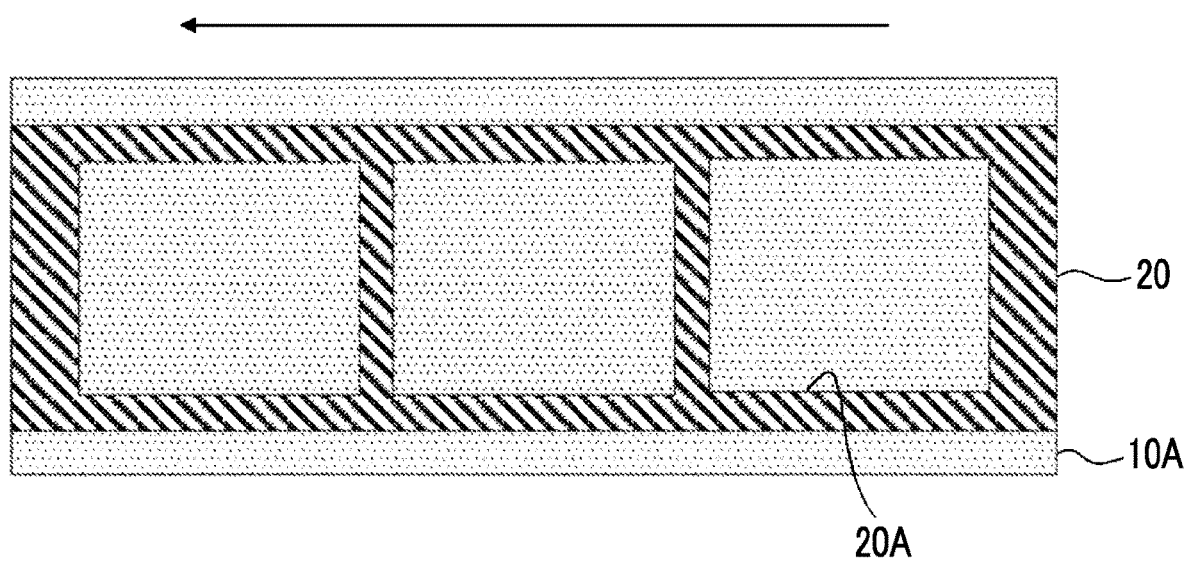

FIG. 3 is a schematic plan view of the forming mold shown in (a) of FIG. 2.

Figure 4:
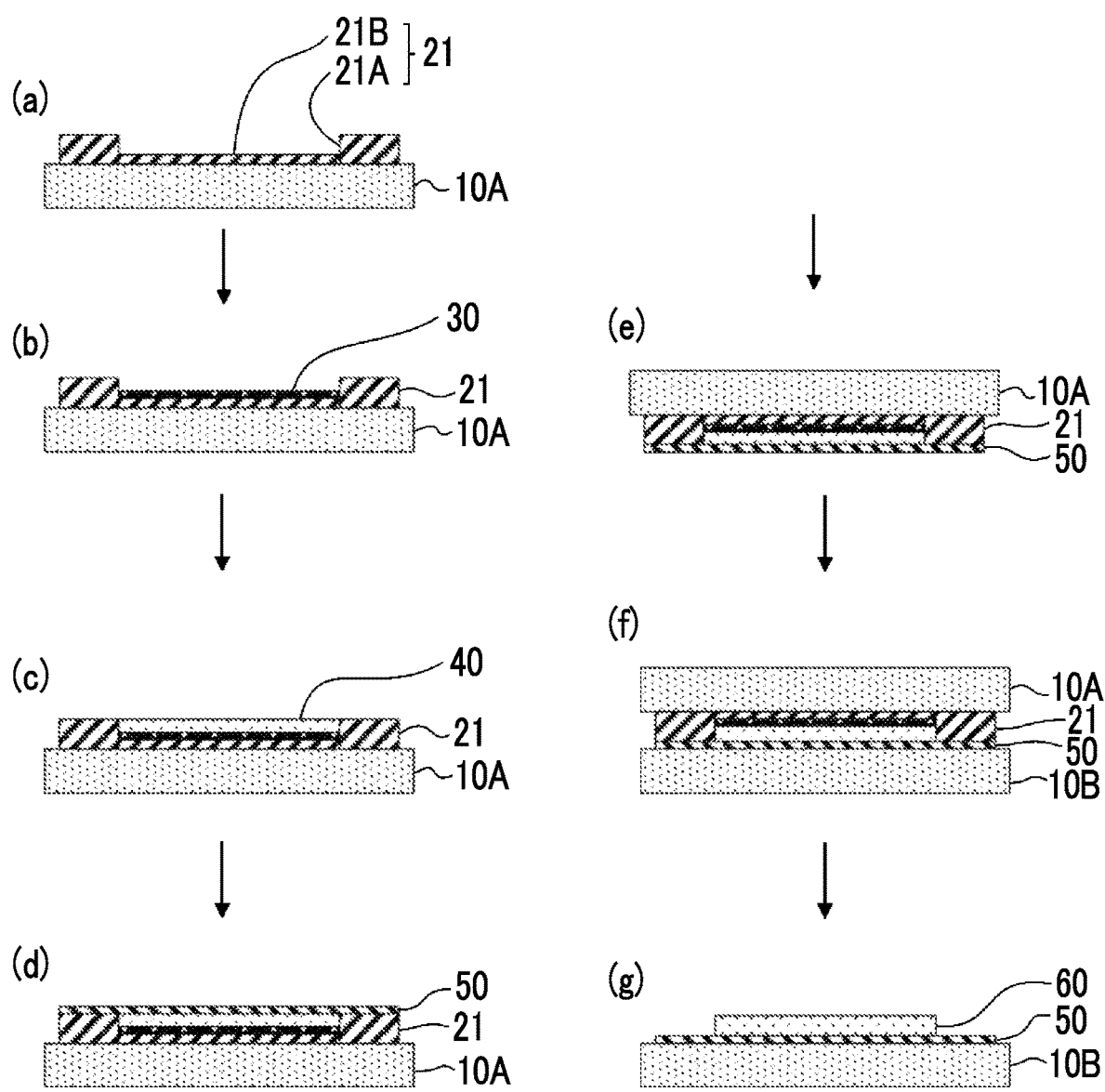

(a) to (g) of FIG. 4 show schematic cross-sectional views showing an example of the method of manufacturing a formed body for an electrode according to the present disclosure.

Figure 5:
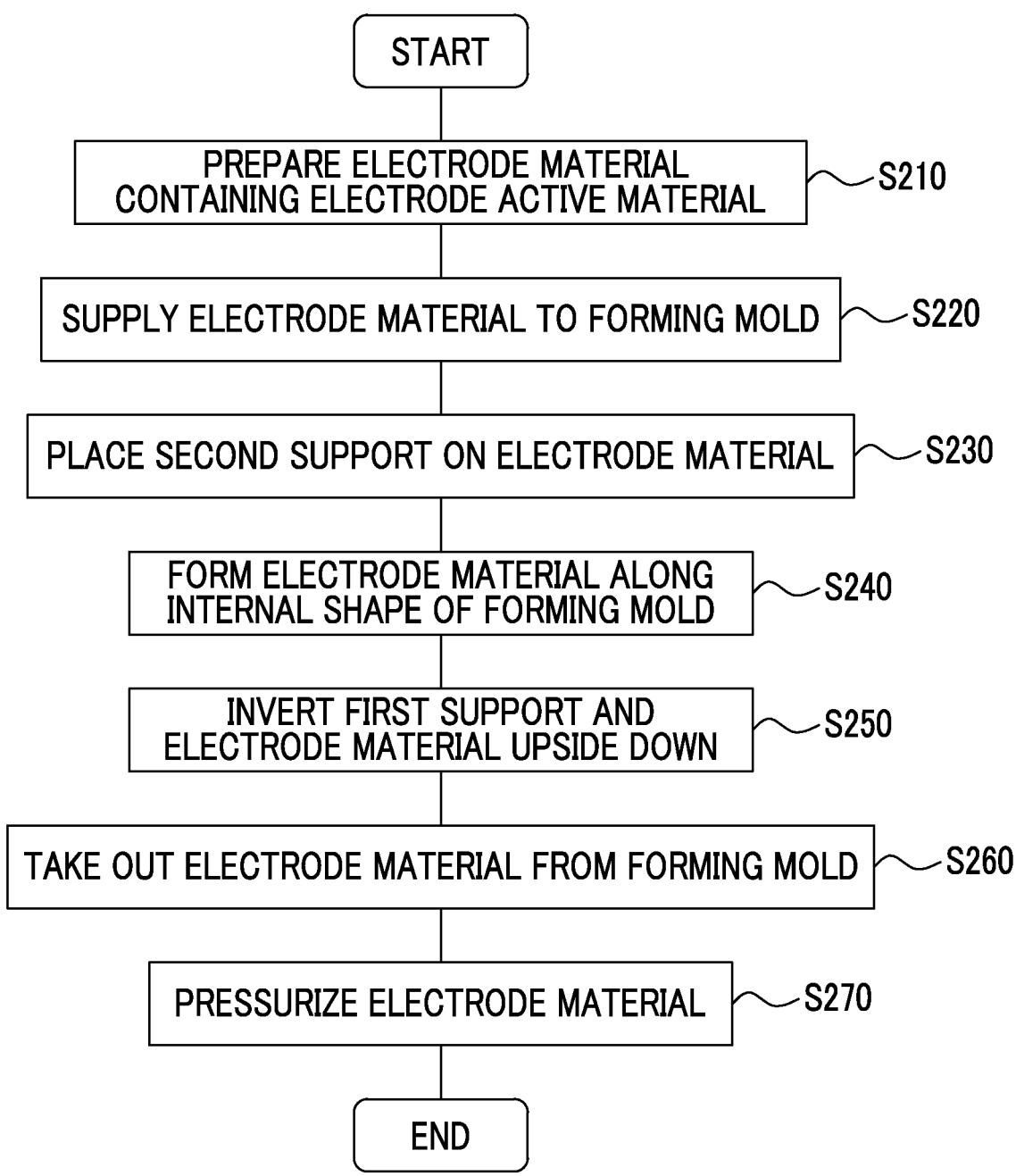

FIG. 5 is a flowchart showing a method of manufacturing a positive electrode sheet in Example 1.

DESCRIPTION OF THE PREFERRED EMBODIMENTS

Hereinafter, embodiments of the present disclosure will be described with reference to the drawings. The present disclosure is not limited to the following embodiments, and may be implemented with appropriate changes within the scope of the object of the present disclosure. The constituent elements denoted by using the same references in the drawings mean that these are the same constituent elements. Descriptions of the overlapping constituent elements and references in the drawings may be omitted. The dimensional ratios in the drawings do not necessarily represent the actual dimensional ratio.

In the present disclosure, a numerical range expressed using "to" means a range including numerical values before and after "to" as a lower limit and an upper limit. In numerical ranges described in a stepwise manner in the present disclosure, an upper limit or a lower limit described in a certain numerical range may be substituted with an upper limit or a lower limit of another numerical range described in a stepwise manner. Furthermore, in a numerical range described in the present disclosure, an upper limit or a lower limit described in a certain numerical range may be substituted with a value shown in an example.

In the present disclosure, the term "step" includes not only an independent step but also cases where it cannot be clearly distinguished from other steps, so long as the desired effect of the step can be achieved.

In the present disclosure, "(meth)acrylic" means acrylic and/or methacrylic.

In the present disclosure, regarding the amount of each component in a composition, in a case where there are a plurality of substances corresponding to the component in the composition, the amount means a total amount of the plurality of substances present in the composition, unless otherwise specified.

In the present disclosure, "mass %" and "wt %" are synonymous, and "parts by mass" and "parts by weight" are synonymous.

In the present disclosure, a combination of two or more preferable aspects is a more preferable aspect.

In the present disclosure, the "solid content" means a component which does not disappear by volatilization or evaporation in a case where a drying treatment is performed on 1 g of a sample at 200° C. for 6 hours under a nitrogen atmosphere.

In the present disclosure, the ordinal numbers (for example, "first" and "second") are terms that are used to distinguish the constituent elements, and do not limit the number of the constituent elements and the superiority or inferiority of the constituent elements.

<Method of Manufacturing Formed Body for Electrode>

A method of manufacturing a formed body for an electrode according to the present disclosure includes in order a step of preparing an electrode material containing an electrode active material (hereinafter, also referred to as "preparation step"), a step of supplying the electrode material to a forming mold which has a frame-shaped side wall portion defining a space portion accommodating the electrode material and has a first support placed on a bottom surface of the forming mold (hereinafter, also referred to as "supply step"), a step of forming the electrode material along an internal shape of the forming mold (hereinafter, also referred to as "forming step"), and a step of taking out the electrode material from the forming mold (hereinafter, also referred to as "take-out step"). In the method of manufacturing a formed body for an electrode according to the present disclosure, a formed body for an electrode having excellent formability can be obtained by providing the above steps. In the present disclosure, "having excellent formability" means that the density distribution (that is, mass distribution) is highly uniform.

The reason why the method of manufacturing a formed body for an electrode according to the present disclosure produces the above effect is presumed as follows.

In a case where the electrode material is formed without the use of the forming mold, the electrode material may be unevenly distributed due to the movement of the electrode material, and thus the formed body for an electrode has a non-uniform density distribution. On the other hand, in the method of manufacturing a formed body for an electrode according to the present disclosure, the electrode material is supplied to a forming mold which has a frame-shaped side wall portion defining a space portion accommodating the electrode material and has a first support placed on a bottom surface of the forming mold, and is formed along an internal shape of the forming mold, and thus it is possible to suppress the uneven distribution of the electrode material that may occur during the course of forming. That is, by forming the electrode material in a state in which a physical constraint occurs by the internal shape (for example, the frame-shaped side wall portion) of the forming mold, it is possible to suppress that the formed body for an electrode has a non-uniform density distribution due to the movement of the electrode material. Therefore, according to the method of manufacturing a formed body for an electrode according to the present disclosure, a formed body for an electrode having excellent formability can be obtained.

In addition, in the method of manufacturing a formed body for an electrode according to the present disclosure, the electrode material can be formed into a desired shape using the forming mold. Since the method of manufacturing a formed body for an electrode according to the present disclosure does not necessarily require processing the formed body for an electrode into a desired shape (for example, cutting), it is also possible to suppress the occurrence of shape defects (for example, collapse of a cut surface) due to the above processing.

Figure 1:
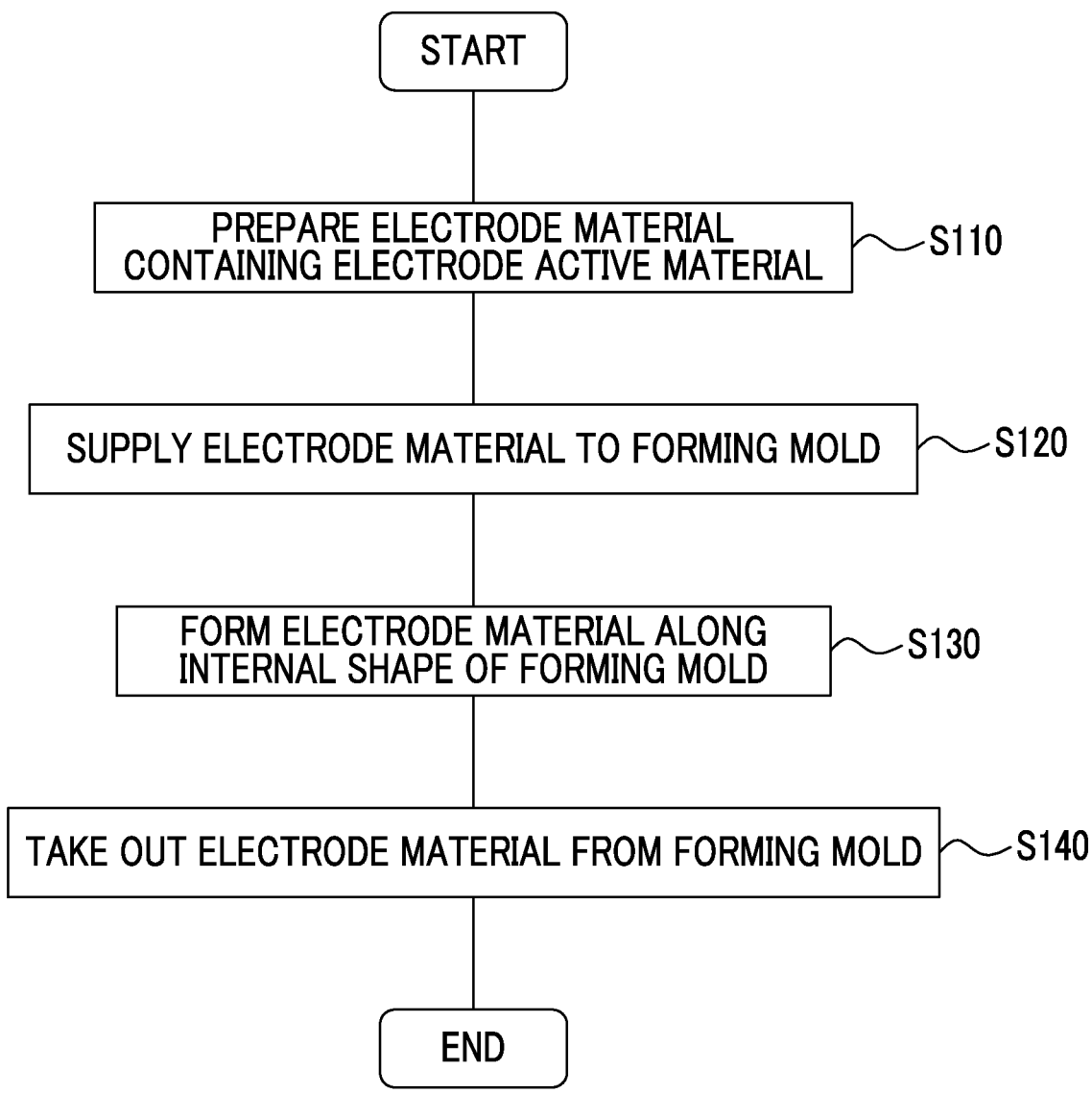
FIG. 1 is a flowchart showing an example of a method of manufacturing a formed body for an electrode according to the present disclosure.

The method of manufacturing a formed body for an electrode according to the present disclosure will be described with reference to the drawings. FIG. 1 is a flowchart showing an example of the method of manufacturing a formed body for an electrode according to the present disclosure.

In S110, an electrode material containing an electrode active material is prepared (preparation step). The electrode material may be previously prepared, or prepared in S110.

In S120, the electrode material is supplied to a forming mold (supply step). In S120, the forming mold has a frame-shaped side wall portion defining a space portion accommodating the electrode material and has a first support placed on a bottom surface of the forming mold.

In S130, the electrode material is formed along an internal shape of the forming mold (forming step). The step in S130 may be performed while the step in S120 is performed.

In S140, the electrode material is taken out from the forming mold (take-out step).

Hereinafter, the steps of the method of manufacturing a formed body for an electrode according to the present disclosure will be described in detail.

<<Preparation Step>>

The method of manufacturing a formed body for an electrode according to the present disclosure includes a step of preparing an electrode material containing an electrode active material (preparation step). In the present disclosure, "preparing an electrode material" means that the electrode material is made to be in a usable state, and includes preparing the electrode material unless otherwise specified. That is, in the preparation step, a pre-prepared electrode material or a commercially available electrode material may be prepared, or an electrode material may be prepared.

[Electrode Material]

The electrode material contains an electrode active material. The electrode material may optionally contain a component other than the electrode active material. Hereinafter, components of the electrode material will be described.

(Electrode Active Material)

The electrode active material is a substance capable of inserting and releasing ions of metal elements belonging to Group 1 or 2 in the periodic table. Examples of the electrode active material include positive electrode active materials and negative electrode active materials.

—Positive Electrode Active Material—

The positive electrode active material is not limited, and known active materials used for a positive electrode can be used. The positive electrode active material is preferably a positive electrode active material capable of reversibly inserting and releasing lithium ions.

Examples of the positive electrode active material include transition metal oxides and elements (for example, sulfur) that can be combined with lithium. Among the above examples, the positive electrode active material is preferably a transition metal oxide.

The transition metal oxide is preferably a transition metal oxide containing at least one transition metal element (hereinafter, referred to as "element Ma") selected from the group consisting of cobalt (Co), nickel (Ni), iron (Fe), manganese (Mn), copper (Cu), and vanadium (V).

In a case where the transition metal oxide contains Li and an element Ma, a molar ratio of Li to the element Ma (substance amount of Li/substance amount of element Ma) is preferably 0.3 to 2.2. In the present disclosure, the "substance amount of element Ma" refers to a total substance amount of all elements corresponding to the element Ma.

In addition, the transition metal oxide may contain at least one transition metal element (hereinafter, referred to as "element Mb") selected from the group consisting of Group 1 elements other than lithium, Group 2 elements, aluminum (Al), gallium (Ga), indium (In), germanium (Ge), tin (Sn), lead (Pb), antimony (Sb), bismuth (Bi), silicon (Si), phosphorus (P), and boron (B). The content of the element Mb (that is, a total content of all elements corresponding to the element Mb) is preferably 0 mol % to 30 mol % with respect to the substance amount of the element Ma.

Examples of the transition metal oxide include transition metal oxides having a bedded salt-type structure, transition metal oxides having a spinel-type structure, lithium-containing transition metal phosphate compounds, lithium-containing transition metal halogenated phosphate compounds, and lithium-containing transition metal silicate compounds.

Examples of the transition metal oxides having a bedded salt-type structure include $LiCoO_2$ (lithium cobalt oxide [LCO]), $LiNi_2O_2$ (lithium nickel oxide), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Examples of the transition metal oxides having a spinel-type structure include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds include olivine-type iron phosphate salts (for example, $LiFePO_4$ and $Li_3Fe_2(PO_4)_3$), iron pyrophosphate salts (for example, $LiFeP_2O_7$), cobalt phosphate salts (for example, $LiCoPO_4$), and monoclinic nasicon-type vanadium phosphate salts (for example, $Li_3V_2(PO_4)_3$ (lithium vanadium phosphate)).

Examples of the lithium-containing transition metal halogenated phosphate compounds include fluorinated iron phosphate salts (for example, $Li_2FePO_4F$), fluorinated manganese phosphate salts (for example, $Li_2MnPO_4F$), and fluorinated cobalt phosphate salts (for example, $Li_2CoPO_4F$).

Examples of the lithium-containing transition metal silicate compounds include $Li_2FeSiO_4$, $Li_2MnSiO_4$, and $Li_2CoSiO_4$.

The transition metal oxide is preferably a transition metal oxide having a bedded salt-type structure, and more preferably at least one compound selected from the group consisting of $LiCoO_2$ (lithium cobalt oxide [LCO]), $LiNi_{0.85}Co_{0.10}Al_{0.05}O_2$ (lithium nickel cobalt aluminum oxide [NCA]), and $LiNi_{1/3}Co_{1/3}Mn_{1/3}O_2$ (lithium nickel manganese cobalt oxide [NMC]).

The positive electrode active material may be a commercially available product or a synthetic product manufactured by a known method (for example, a firing method). For example, a positive electrode active material obtained by the firing method may be washed with water, an acidic aqueous solution, an alkaline aqueous solution, or an organic solvent.

The composition of the positive electrode active material is measured using inductive coupling plasma (ICP) emission spectrometric analysis.

The shape of the positive electrode active material is not limited, and is preferably a particulate shape from the viewpoint of handleability.

The volume average particle diameter of the positive electrode active material is not limited, and may be, for example, 0.1 µm to 50 µm. The volume average particle diameter of the positive electrode active material is preferably 0.3 µm to 40 µm, and more preferably 0.5 µm to 30 µm. In a case where the volume average particle diameter of the positive electrode active material is 0.3 µm or more, it is possible to easily form an aggregate of the electrode material, and it is possible to suppress the scattering of the electrode material during handling. In a case where the volume average particle diameter of the positive electrode active material is 40 µm or less, it is possible to easily adjust the thickness of a formed body for an electrode, and it is possible to suppress the generation of voids during the course of forming.

The volume average particle diameter of the positive electrode active material is measured by the following method. A dispersion liquid containing 0.1 mass % of the positive electrode active material is prepared by mixing the positive electrode active material with a solvent (for example, heptane, octane, toluene, or xylene). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the positive electrode active material. For other detailed conditions, refer to "JIS Z 8828: 2013" as necessary.

Examples of the method of adjusting the particle diameter of the positive electrode active material include a method using a pulverizer or a classifier.

The electrode material may contain one kind of positive electrode active material alone, or two or more kinds of positive electrode active materials.

The content of the positive electrode active material is preferably 10 mass % to 95 mass %, more preferably 30 mass % to 90 mass %, even more preferably 50 mass % to 85 mass %, and particularly preferably 70 mass % to 80 mass % with respect to the total solid content mass of the electrode material.

—Negative Electrode Active Material—

The negative electrode active material is not limited, and known active materials used for a negative electrode can be used. The negative electrode active material is preferably a negative electrode active material capable of reversibly inserting and releasing lithium ions.

Examples of the negative electrode active material include carbonaceous materials, metal oxides (for example, tin oxide), silicon oxides, metal composite oxides, lithium single bodies, lithium alloys (for example, lithium aluminum alloy), and metals (for example, Sn, Si, and In) that can form an alloy with lithium. Among the above examples, the negative electrode active material is preferably a carbonaceous material or a lithium composite oxide from the viewpoint of reliability.

The carbonaceous material is substantially a material consisting of carbon. Examples of the carbonaceous material include carbonaceous materials obtained by firing petroleum pitch, carbon black (for example, acetylene black), graphite (for example, natural graphite and artificial graphite (for example, vapor-grown graphite)), hard carbon, or synthetic resins (for example, polyacrylonitrile (PAN) and furfuryl alcohol resin). Examples of the carbonaceous material also include carbon fibers (for example, polyacrylonitrile-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and activated carbon fibers). Examples of the graphite include mesophase microspheres, graphite whisker, and flat graphite. In the present disclosure, "flat" means a shape having two principal planes facing in opposite directions.

The metal composite oxide is preferably a metal composite oxide capable of storing and releasing lithium. The metal composite oxide capable of storing and releasing lithium preferably contains at least one element selected from the group consisting of titanium and lithium from the viewpoint of high current density charging and discharging characteristics.

The metal oxide and the metal composite oxide are particularly preferably amorphous oxides. Here, "amorphous" means a substance having a broad scattering band having a peak at 20° to 40° in terms of 2θ in an X-ray diffraction method using CuKα rays. The amorphous oxide may have a crystalline diffraction line. In the amorphous oxide, the highest intensity of the crystalline diffraction lines observed at 40° to 70° in terms of 2θ is preferably 100 times or less, and more preferably 5 times or less the intensity of a diffraction line having a peak in a broad scattering band observed at 20° to 40° in terms of 2θ. The amorphous oxide particularly preferably has no crystalline diffraction line.

The metal oxide and the metal composite oxide are also preferably chalcogenides. A chalcogenide is a reaction product of a metal element and an element of Group 16 in the periodic table.

Among the compound group consisting of amorphous oxides and chalcogenides, amorphous oxides and chalcogenides of metalloid elements are preferable, and oxides and chalcogenides containing at least one element selected from the group consisting of elements of Groups 13 to 15 in the periodic table, Al, Ga, Si, Sn, Ge, Pb, Sb, and Bi are more preferable.

Preferable examples of the amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, the above-described compound may be a composite oxide with lithium (for example, $Li_2SnO_2$).

The negative electrode active material preferably further contains titanium. The negative electrode active material containing titanium is preferably $Li_4Ti_5O_{12}$ (lithium titanate [LTO]) from the viewpoint that it has excellent high-speed charging and discharging characteristics since the volume thereof changes only to a small extent during the storing and release of lithium ions, and the life of the lithium ion secondary battery can be improved due to the suppression of deterioration of the electrode.

The negative electrode active material may be a commercially available product or a synthetic product manufactured by a known method (for example, a firing method). For example, a negative electrode active material obtained by the firing method may be washed using water, an acidic aqueous solution, an alkaline aqueous solution, or an organic solvent.

For example, CGB20 (Nippon Graphite Industries, Co., Ltd.) is available as the negative electrode active material.

The composition of the negative electrode active material is measured using inductive coupling plasma (ICP) emission spectrometric analysis.

The shape of the negative electrode active material is not limited, and is preferably a particulate shape from the viewpoint of easy handling and easy control of uniformity during mass production.

The volume average particle diameter of the negative electrode active material is preferably 0.1 µm to 60 µm, more preferably 0.3 µm to 50 µm, and particularly preferably 0.5 µm to 40 µm. In a case where the volume average particle diameter of the negative electrode active material is 0.1 µm or more, it is possible to easily form an aggregate of the electrode material, and it is possible to suppress the scattering of the electrode material during handling. In a case where the volume average particle diameter of the negative electrode active material is 60 µm or less, it is possible to easily adjust the thickness of a formed body for an electrode, and it is possible to suppress the generation of voids during the course of forming. The volume average particle diameter of the negative electrode active material is measured by a method according to the method of measuring the volume average particle diameter of the positive electrode active material.

Examples of the method of adjusting the particle diameter of the negative electrode active material include a method using a pulverizer or a classifier. In the above-described method, for example, a mortar, a ball mill, a sand mill, a vibrating ball mill, a satellite ball mill, a planetary ball mill, a swirling airflow-type jet mill, or a sieve is suitably used. In the pulverization of the negative electrode active material, wet pulverization using water or an organic solvent (for example, methanol) can also be optionally performed. The method of adjusting to a desired particle diameter is preferably classification. In the classification, for example, a sieve or a wind power classifier can be used. The classification may be performed in a dry manner or in a wet manner.

In a case where an amorphous oxide containing Sn, Si, or Ge is used as the negative electrode active material, preferable examples of the negative electrode active material that can be used in combination with the above-described amorphous oxide include carbon materials capable of storing and releasing lithium ions or a lithium metal, lithium, lithium alloys, and metals capable of being alloyed with lithium.

The electrode material may contain one kind of negative electrode active material alone, or two or more kinds of negative electrode active materials.

The content of the negative electrode active material is preferably 10 mass % to 80 mass %, more preferably 20 mass % to 80 mass %, even more preferably 30 mass % to 80 mass %, and particularly preferably 40 mass % to 75 mass % with respect to the total solid content mass of the electrode material.

The surfaces of the positive electrode active material and the negative electrode active material may be coated with a surface coating agent. Examples of the surface coating agent include metal oxides containing Ti, Nb, Ta, W, Zr, Si, or Li. Examples of the metal oxides include titanate spinels, tantalum-based oxides, niobium-based oxides, and lithium niobate-based compounds. Specific examples of the compounds include $Li_4Ti_5O_{12}$, $LiTaO_3$, $LiNbO_3$, $LiA_1O_2$, $Li_2ZrO_3$, $Li_2WO_4$, $Li_2TiO_3$, $Li_2B_4O_7$, $Li_3PO_4$, $Li_2MoO_4$, and $LiBO_2$.

(Inorganic Solid Electrolyte)

The electrode material preferably contains an inorganic solid electrolyte from the viewpoint of an improvement in battery performance (for example, discharge capacity and output characteristics). Here, the "solid electrolyte" means a solid-state electrolyte in which ions can move inside thereof.

Since the inorganic solid electrolyte is not an electrolyte containing an organic substance as a principal ion-conductive material, it is clearly differentiated from organic solid electrolytes (for example, polymer electrolytes represented by polyethylene oxide (PEO), and organic electrolyte salts represented by lithium bis(trifluoromethanesulfonyl)imide (LiTFSI)). In addition, since the inorganic solid electrolyte is solid at steady state, it is not dissociated or liberated into cations or anions. Therefore, the inorganic solid electrolyte is also clearly differentiated from inorganic electrolyte salts (for example, $LiPF_6$, $LiBF_4$, lithium bis(fluoroulfonyl)imide (LiFSI), and LiCl) that are dissociated or liberated into cations or anions in electrolytic solutions or polymers.

The inorganic solid electrolyte is not limited as long as it is an inorganic solid electrolyte having ion conductivity of a metal element belonging to Group 1 or 2 in the periodic table, and generally does not have electron conductivity.

In a case where a formed body for an electrode obtained by the method of manufacturing a formed body for an electrode according to the present disclosure is used for a lithium ion battery, the inorganic solid electrolyte preferably has lithium ion conductivity.

Examples of the inorganic solid electrolyte include sulfide-based inorganic solid electrolytes and oxide-based inorganic solid electrolytes. Among the above examples, the inorganic solid electrolyte is preferably a sulfide-based inorganic solid electrolyte from the viewpoint that a good interface can be formed between the active material and the inorganic solid electrolyte.

—Sulfide-Based Inorganic Solid Electrolyte—

The sulfide-based inorganic solid electrolyte preferably contains a sulfur atom (S), has ion conductivity of a metal element belonging to Group 1 or 2 in the periodic table, and has an electron-insulating property.

The sulfide-based inorganic solid electrolyte more preferably contains at least Li, S, and P, and has lithium ion conductivity. The sulfide-based inorganic solid electrolyte may optionally contain an element other than Li, S, and P.

Examples of the sulfide-based inorganic solid electrolyte include an inorganic solid electrolyte having a composition represented by Formula (A).

$$L_{a1}M_{b1}P_{c1}S_{d1}A_{e1}: \quad \text{Formula (A)}$$

In Formula (A), L represents at least one element selected from the group consisting of Li, Na, and K, and is preferably Li.

In Formula (A), M represents at least one element selected from the group consisting of B, Zn, Sn, Si, Cu, Ga, Sb, Al, and Ge, and is preferably B, Sn, Si, Al, or Ge, and more preferably Sn, Al, or Ge.

In Formula (A), A represents at least one element selected from the group consisting of I, Br, Cl, and F, and is preferably I or Br, and more preferably I.

In Formula (A), a1 represents 1 to 12, and is preferably 1 to 9, and more preferably 1.5 to 4.

In Formula (A), b1 represents 0 to 1, and is more preferably 0 to 0.5.

In Formula (A), c1 represents 1.

In Formula (A), d1 represents 2 to 12, and is preferably 3 to 7, and more preferably 3.25 to 4.5.

In Formula (A), e1 represents 0 to 5, and is preferably 0 to 3, and more preferably 0 to 1.

In Formula (A), it is preferable that b1 and e1 are 0, it is more preferable that b1 and e1 are 0, and a proportion of a1, e1, and d1 (that is, a1:e1:d1) is 1 to 9:1:3 to 7, and it is particularly preferable that b1 and e1 are 0, and a proportion of a1, e1, and d1 (that is, a1:e1:d1) is 1.5 to 4:1:3.25 to 4.5.

The compositional ratio of each element can be controlled by, for example, adjusting an amount of the raw material compound to be blended in the manufacturing of the sulfide-based inorganic solid electrolyte.

The sulfide-based inorganic solid electrolyte may be amorphous (glass) or crystallized (glass ceramics), or only partially crystallized. Examples of the sulfide-based inorganic solid electrolyte described above include Li—P—S-based glass containing Li, P, and S, and Li—P—S-based glass ceramics containing Li, P, and S. Among the above examples, the sulfide-based inorganic solid electrolyte is preferably Li—P—S-based glass.

The lithium ion conductivity of the sulfide-based inorganic solid electrolyte is preferably $1 \times 10^{-4}$ S/cm or more, and more preferably $1 \times 10^{-3}$ S/cm or more. The upper limit of the lithium ion conductivity of the sulfide-based inorganic solid electrolyte is not limited. The lithium ion conductivity of the sulfide-based inorganic solid electrolyte is, for example, substantially 1×S/cm or less.

The sulfide-based inorganic solid electrolyte can be manufactured by, for example, (1) a reaction of lithium sulfide ($Li_2S$) and phosphorus sulfide (for example, diphosphorus pentasulfide ($P_2S_5$)), (2) a reaction of lithium sulfide and at least one of a phosphorus single body or a sulfur single body, or (3) a reaction of lithium sulfide, phosphorus sulfide (for example, diphosphorus pentasulfide ($P_2S_5$)), and at least one of a phosphorus single body or a sulfur single body.

The molar ratio of $Li_2S$ to $P_2S_5$ ($Li_2S:P_2S_5$) in the manufacturing of the Li—P—S-based glass and the Li—P—S-based glass ceramics is preferably 65:35 to 85:15, and more preferably 68:32 to 77:23. By setting the molar ratio of $Li_2S$ to $P_2S_5$ within the above range, lithium ion conductivity can be further increased.

Examples of the sulfide-based inorganic solid electrolyte include a compound prepared using a raw material composition containing $Li_2S$ and a sulfide of an element of Groups 13 to 15. Examples of the raw material composition include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $L_{12}S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among the above examples, the raw material composition is preferably $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$, and more preferably $Li_2S$—$P_2S_5$, $Li_{10}GeP_2S_{12}$, or $Li_2S$—$P_2S_5$—$SiS_2$ from the viewpoint of high lithium ion conductivity.

Examples of the method of manufacturing the sulfide-based inorganic solid electrolyte material using the above-described raw material composition include an amorphization method. Examples of the amorphization method include a mechanical milling method and a melting quenching method. Among the above examples, a mechanical milling method is preferable from the viewpoint that the treatment can be performed at normal temperature and the manufacturing process can be simplified.

—Oxide-Based Inorganic Solid Electrolyte—

The oxide-based inorganic solid electrolyte preferably contains an oxygen atom (O), has ion conductivity of a metal element belonging to Group 1 or Group 2 in the periodic table, and has an electron-insulating property.

The ion conductivity of the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit of the ion conductivity of the oxide-based inorganic solid electrolyte is not limited. The ion conductivity of the oxide-based inorganic solid electrolyte is, for example, substantially $1 \times 10^{-1}$ S/cm or less.

Examples of the oxide-based inorganic solid electrolyte include $Li_{xa}La_{ya}TiO_3$ (hereinafter, referred to as "LLT". xa satisfies $0.3 \leq xa \leq 0.7$ and ya satisfies $0.3 \leq ya \leq 0.7$); $Li_{xb}La_{yb}Zr_{zb}M^{bb}{}_{mb}O_{nb}$ ($M^{bb}$ is at least one element selected from the group consisting of Al, Mg, Ca, Sr, V, Nb, Ta, Ti, Ge, In, and Sn. xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}{}_{zc}O_{nc}$ ($M^{cc}$ is at least one element selected from the group consisting of C, S, Al, Si, Ga, Ge, In, and Sn. xc satisfies $0 \leq xc \leq 5$, yc satisfies $0 \leq yc \leq 1$, zc satisfies $0 \leq zc \leq 1$, and nc satisfies $0 \leq nc \leq 6$); $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, and satisfies $1 \leq md \leq 7$, and nd satisfies $3 \leq nd \leq 13$); $Li_{(3-2xe)}M^{ee}{}_{xe}D_{ee}O$ (xe satisfies $0 \leq xe \leq 0.1$, $M^{ee}$ represents a divalent metal atom, and $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 \leq zf \leq 10$); $Li_{xg}S_{yg}O_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies w<1); $Li_{3.5}Zn_{0.25}GeO_4$ having a LISICON (Lithium super ionic conductor)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0 \leq xh \leq 1$, and yh satisfies $0 \leq yh \leq 1$); and $Li_7La_3Zr_2O_{12}$ (hereinafter, referred to as "LLZ") having a garnet-type crystal structure.

As the oxide-based inorganic solid electrolyte, phosphorus compounds containing Li, P, and O are also preferable. Examples of the phosphorus compounds containing Li, P, and O include lithium phosphate ($Li_3PO_4$), LiPON in which a part of oxygen of lithium phosphate is substituted with nitrogen, and LiPOD1 (D1 is at least one element selected from the group consisting of Ti, V, Cr, Mn, Fe, Co, Ni, Cu, Zr, Nb, Mo, Ru, Ag, Ta, W, Pt, and Au).

As the oxide-based inorganic solid electrolyte, $LiA^1ON$ ($A^1$ is at least one element selected from the group consisting of Si, B, Ge, Al, C, and Ga) is also preferable.

Among the above examples, the oxide-based inorganic solid electrolyte is preferably LLT, $Li_{xb}La_{yb}Zr_{zb}M^{bb}{}_{mb}O_{nb}$ ($M^{bb}$, xb, yb, zb, mb, and nb are as described above), LLZ, Li$_3$BO$_3$, Li$_3$BO$_3$—Li$_2$SO$_4$, or Li$_{xd}$(Al, Ga)$_{yd}$(Ti, Ge)$_{zd-}$Si$_{ad}$P$_{md}$O$_{nd}$ (xd, yd, zd, ad, md, and nd are as described above), more preferably LLT, LLZ, LAGP (Li$_{1.5}$Al$_{0.5}$Ge$_{1.5}$(PO$_4$)$_3$), or LATP ([Li$_{1.4}$Ti$_2$Si$_{0.4}$P$_{2.6}$O$_{12}$]—AlPO$_4$), and particularly preferably LLZ.

The inorganic solid electrolyte preferably has a particulate shape.

The volume average particle diameter of the inorganic solid electrolyte is preferably 0.01 μm or more, and more preferably 0.1 μm or more. The volume average particle diameter of the inorganic solid electrolyte is preferably 100 μm or less, and more preferably 50 μm or less.

The volume average particle diameter of the inorganic solid electrolyte is measured by the following method. A dispersion liquid containing 1 mass % of the inorganic solid electrolyte is prepared by mixing the inorganic solid electrolyte with water (heptane in a case where the volume average particle diameter of a substance unstable to water is measured). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the inorganic solid electrolyte. For other detailed conditions, refer to "JIS Z 8828: 2013" as necessary.

The electrode material may contain one kind of inorganic solid electrolyte alone, or two or more kinds of inorganic solid electrolytes.

In a case where the electrode material contains an inorganic solid electrolyte, the content of the inorganic solid electrolyte is preferably 1 mass % or more, more preferably 5 mass % or more, and particularly preferably 10 mass % or more with respect to the total solid content mass of the electrode material from the viewpoint of reduction of interface resistance and a battery characteristic maintaining effect (for example, improvement in cycle characteristics). From the same viewpoint, the content of the inorganic solid electrolyte is preferably 90 mass % or less, more preferably 70 mass % or less, and particularly preferably 50 mass % or less with respect to the total solid content mass of the electrode material.

(Binder)

The electrode material preferably contains a binder from the viewpoint of an improvement in adhesiveness between the electrode materials. The binder is not limited as long as it is an organic polymer, and known binders used as a binder in a positive electrode or a negative electrode of the battery material can be used. Examples of the binder include fluorine-containing resins, hydrocarbon-based thermoplastic resins, acrylic resins, and urethane resins.

Examples of the fluorine-containing resins include polytetrafluoroethylene (PTFE), polyvinylene difluoride (PVdF), and a copolymer of polyvinylene difluoride and hexafluoropropylene (PVdF-HFP).

Examples of the hydrocarbon-based thermoplastic resins include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of the acrylic resins include methyl poly(meth)acrylate, ethyl poly(meth)acrylate, isopropyl poly(meth)acrylate, isobutyl poly(meth)acrylate, butyl poly(meth)acrylate, hexyl poly(meth)acrylate, octyl poly(meth)acrylate, dodecyl poly(meth)acrylate, stearyl poly(meth)acrylate, 2-hydroxyethyl poly(meth)acrylate, poly(meth)acrylate, benzyl poly(meth)acrylate, glycidyl poly(meth)acrylate, dimethylaminopropyl poly(meth)acrylate, and copolymers of monomers forming the above resins.

Examples of the binder also include copolymers of vinyl-based monomers. Examples of the copolymers of vinyl-based monomers include a methyl (meth)acrylate-styrene copolymer, a methyl (meth)acrylate-acrylonitrile copolymer, and a butyl(meth)acrylate-acrylonitrile-styrene copolymer.

The weight-average molecular weight of the binder is preferably 10,000 or more, more preferably 20,000 or more, and particularly preferably 50,000 or more. The weight-average molecular weight of the binder is preferably 1,000,000 or less, more preferably 200,000 or less, and particularly preferably 100,000 or less.

The moisture concentration in the binder is preferably 100 ppm or less on a mass basis.

The metal concentration in the binder is preferably 100 ppm or less on a mass basis.

The electrode material may contain one kind of binder alone, or two or more kinds of binders.

In a case where the electrode material contains a binder, the content of the binder is preferably 0.01 mass % or more, more preferably 0.1 mass % or more, and particularly preferably 1 mass % or more with respect to the total solid content mass of the electrode material from the viewpoint of reduction of interface resistance and maintaining of the reduction. The content of the binder is preferably 10 mass % or less, more preferably 5 mass % or less, and particularly preferably 3 mass % or less with respect to the total solid content mass of the electrode material from the viewpoint of battery performance.

In a case where the electrode material contains an electrode active material, an inorganic solid electrolyte, and a binder, a ratio of the total mass of the active material and the inorganic solid electrolyte to the mass of the binder ([mass of active material+mass of inorganic solid electrolyte]/[mass of the binder]) is preferably 1,000 to 1, more preferably 500 to 2, and particularly preferably 100 to 10.

(Conductive Auxiliary Agent)

The electrode material preferably contains a conductive auxiliary agent from the viewpoint of an improvement in electronic conductivity of the active material. The conductive auxiliary agent is not limited, and known conductive auxiliary agents can be used. In particular, in a case where the electrode material contains a positive electrode active material, the electrode material preferably contains a conductive auxiliary agent.

Examples of the conductive auxiliary agent include graphite (for example, natural graphite and artificial graphite), carbon black (for example, acetylene black, Ketjen black, and furnace black), amorphous carbon (for example, needle coke), carbon fibers (for example, vapor-grown carbon fibers and carbon nanotubes), other carbonaceous materials (for example, graphene and fullerene), metal powders (for example, a copper powder and a nickel powder), metal fibers (for example, copper fibers and nickel fibers), and conductive polymers (for example, polyaniline, polypyrrole, polythiophene, polyacetylene, and polyphenylene derivatives).

Among the above examples, the conductive auxiliary agent is preferably at least one conductive auxiliary agent selected from the group consisting of carbon fibers and metal fibers.

Examples of the shape of the conductive auxiliary agent include a fibrous shape, an acicular shape, a tubular shape, a dumbbell shape, a disk shape, and an oval spherical shape. Among the above examples, the shape of the conductive auxiliary agent is preferably a fibrous shape from the viewpoint of an improvement in electronic conductivity of the active material.

The aspect ratio of the conductive auxiliary agent is preferably 1.5 or more, and more preferably 5 or more. In a case where the aspect ratio of the conductive auxiliary agent is 1.5 or more, the electron conductivity of the electrode active material can be improved, and thus the output characteristics of the battery can be improved.

The aspect ratio of the conductive auxiliary agent is preferably 10,000 or less, more preferably 5,000 or less, and particularly preferably 1,000 or less. Furthermore, the aspect ratio of the conductive auxiliary agent is preferably 500 or less, more preferably 300 or less, and particularly preferably 100 or less. In a case where the aspect ratio of the conductive auxiliary agent is 10,000 or less, the dispersibility of the conductive auxiliary agent can be improved, and a short circuit due to the conductive auxiliary agent penetrating a formed body for an electrode can be efficiently prevented.

The aspect ratio of the conductive auxiliary agent is measured by the following method. SEM images of three optional visual fields taken at 1,000 to 3,000-fold observation magnification using a scanning electron microscope (SEM) (for example, XL30 manufactured by Koninklijke Philips N.V) are converted to bitmap (BMP) files. Images of 50 particles of the conductive auxiliary agent are imported using image analysis software (for example, "A-ZOKUN" that is an integrated application of IP-1000PC manufactured by Asahi Engineering Co., Ltd.). A maximum length and a minimum length of each of the particles of the conductive auxiliary agent are read in a state in which the particles of the conductive auxiliary agent are observed without being overlapped. The "maximum length of the conductive auxiliary agent" means the length (that is, major axis length) of a line segment having the maximum length among line segments from a certain point to another point on the outer circumference of the conductive auxiliary agent particle. The "minimum length of the conductive auxiliary agent" means the length (that is, minor axis length) of a line segment having the minimum length among line segments from a certain point to another point on the outer circumference of the conductive auxiliary agent particle, which are orthogonal to the line segment having the maximum value. An average (A) of 40 points excluding upper 5 points and lower 5 points among the maximum lengths (major axis lengths) of the 50 particles of the conductive auxiliary agent is obtained. Next, an average (B) of 40 points excluding upper 5 points and lower 5 points among the minimum lengths (minor axis lengths) of the 50 particles of the conductive auxiliary agent is obtained. The aspect ratio of the conductive auxiliary agent is calculated by dividing the average (A) by the average (B).

The minor axis length of the conductive auxiliary agent is preferably 10 μm or less, more preferably 8 μm or less, and particularly preferably 5 μm or less.

The minor axis length of the conductive auxiliary agent is preferably 1 nm or more, more preferably 3 nm or more, and particularly preferably 5 nm or more.

The minor axis length of the conductive auxiliary agent is the minimum length of each of 50 particles of the conductive auxiliary agent calculated in the method of measuring the aspect ratio of the conductive auxiliary agent.

The average minor axis length of the conductive auxiliary agent is preferably 8 μm or less, more preferably 5 μm or less, and particularly preferably 3 μm or less.

The average minor axis length of the conductive auxiliary agent is preferably 1 nm or more, more preferably 2 nm or more, and particularly preferably 3 nm or more.

The average minor axis length of the conductive auxiliary agent is an average of the minor axis lengths of the particles of the conductive auxiliary agent, excluding upper 10% (that is, upper 5 points) and lower 10% (that is, lower 5 points) of the minimum lengths (minor axis lengths) of 50 particles of the conductive auxiliary agent calculated in the method of measuring the aspect ratio of the conductive auxiliary agent.

The electrode material may contain one kind of conductive auxiliary agent alone, or two or more kinds of conductive auxiliary agents.

In a case where the electrode material contains a conductive auxiliary agent, the content of the conductive auxiliary agent is preferably more than 0 mass % and 10 mass % or less, more preferably 0.5 mass % to 8 mass %, and particularly preferably 1 mass % to 7 mass % with respect to the total solid content mass of the electrode material from the viewpoint of an improvement in electronic conductivity of the active material.

(Lithium Salt)

The electrode material preferably contains a lithium salt from the viewpoint of an improvement in battery performance. The lithium salt is not limited, and known lithium salts can be used.

As the lithium salt, the lithium salts described in paragraphs 0082 to 0085 of JP2015-088486A are preferable.

The electrode material may contain one kind of lithium salt alone, or two or more kinds of lithium salts.

In a case where the electrode material contains a lithium salt, the content of the lithium salt is preferably 0.1 mass % to 10 mass % with respect to the total solid content mass of the electrode material.

(Dispersant)

The electrode material preferably contains a dispersant. In a case where the electrode material contains a dispersant, it is possible to suppress the aggregation in a case where the concentration of any one of the electrode active material or the inorganic solid electrolyte is high.

The dispersant is not limited, and known dispersants can be used. The dispersant is preferably a compound formed of low molecules of a molecular weight of 200 or more and less than 3,000 or oligomers, and having a functional group represented by the following functional group (I) and an alkyl group having 8 or more carbon atoms or an aryl group having 10 or more carbon atoms in the same molecule.

The functional group (I) is at least one functional group selected from the group consisting of an acidic group, a group having a basic nitrogen atom, a (meth)acryloyl group, a (meth)acrylamide group, an alkoxysilyl group, an epoxy group, an oxetanyl group, an isocyanate group, a cyano group, and a sulfanyl group, and a hydroxy group, preferably at least one functional group selected from the group consisting of an acidic group, a group having a basic nitrogen atom, an alkoxysilyl group, a cyano group, a sulfanyl group, and a hydroxy group, and more preferably at least one functional group selected from the group consisting of a carboxy group, a sulfonic acid group, a cyano group, an amino group, and a hydroxy group.

The electrode material may contain one kind of dispersant alone, or two or more kinds of dispersants.

In a case where the electrode material contains a dispersant, the content of the dispersant is preferably 0.2 mass % to 10 mass %, and more preferably 0.5 mass % to 5 mass % with respect to the total solid content mass of the electrode material from the viewpoint that both the prevention of aggregation and the battery performance are achieved.

(Liquid Component)

The electrode material may contain a liquid component. Examples of the liquid component include an electrolytic solution.

The electrolytic solution is not limited, and known electrolytic solutions can be used. Examples of the electrolytic solution include an electrolytic solution containing a lithium salt compound and a carbonate compound.

Examples of the lithium salt compound include lithium hexafluorophosphate. The electrolytic solution may contain one kind of lithium salt compound alone, or two or more kinds of lithium salt compounds.

Examples of the carbonate compound include ethyl methyl carbonate, ethylene carbonate, and propylene carbonate. The electrolytic solution may contain one kind of carbonate compound alone, or two or more kinds of carbonate compounds.

The content of the electrolytic solution in the electrode material is preferably 30 mass % or less, more preferably 20 mass % or less, and particularly preferably 15 mass % or less with respect to the total mass of the electrode material. In a case where the content of the electrolytic solution in the electrode material is 30 mass % or less, it is possible to suppress the oozing of the electrolytic solution during the forming of the electrode material.

The content of the electrolytic solution in the electrode material is preferably 0.01 mass % or more, and more preferably 0.1 mass % or more with respect to the total mass of the electrode material from the viewpoint of an improvement in battery performance.

The electrode material may contain, as a liquid component, a solvent other than the solvent contained as a component of the electrolytic solution (hereinafter, also simply referred to as "solvent"). Examples of the solvent include alcohol compound solvents, ether compound solvents, amide compound solvents, amino compound solvents, ketone compound solvents, aromatic compound solvents, aliphatic compound solvents, and nitrile compound solvents.

Examples of the alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound solvents include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, and triethylene glycol monobutyl ether), dimethyl ether, diethyl ether, diisopropyl ether, dibutyl ether, tetrahydrofuran, and dioxane.

Examples of the amide compound solvents include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric triamide.

Examples of the amino compound solvents include triethylamine, diisopropylethylamine, and tributylamine.

Examples of the ketone compound solvents include acetone, methyl ethyl ketone, methyl isobutyl ketone, and cyclohexanone.

Examples of the aromatic compound solvents include benzene, toluene, and xylene.

Examples of the aliphatic compound solvents include hexane, heptane, octane, and decane.

Examples of the nitrile compound solvents include acetonitrile, propyronitrile, and isobutyronitrile.

The solvent is preferably at least one solvent selected from the group consisting of a nitrile compound solvent, an aromatic compound solvent, and an aliphatic compound solvent, more preferably at least one solvent selected from the group consisting of isobutyronitrile, toluene, and heptane, and particularly preferably at least one solvent selected from the group consisting of toluene and heptane.

The boiling point of the solvent is preferably 50° C. or higher, and more preferably 70° C. or higher at normal pressure (that is, 1 atm). The boiling point of the solvent is preferably 250° C. or lower, and more preferably 220° C. or lower.

The electrode material may contain one kind of solvent alone, or two or more kinds of solvents.

The content of the solvent (including the solvent contained as a component of the electrolytic solution, and this is the same in this paragraph) in the electrode material is preferably 30 mass % or less, more preferably 20 mass % or less, and particularly preferably 15 mass % or less with respect to the total mass of the electrode material. In a case where the content of the solvent in the electrode material is 30 mass % or less, it is possible to suppress the deterioration of battery performance, and it is possible to suppress the oozing of the solvent during the forming of the electrode material. The lower limit of the content of the solvent in the electrode material is not limited. The content of the solvent in the electrode material may be 0 mass % or more, or may exceed 0 mass %.

The content of the liquid component in the electrode material is preferably 30 mass % or less, more preferably 20 mass % or less, and particularly preferably 15 mass % or less with respect to the total mass of the electrode material. In a case where the content of the liquid component in the electrode material is 30 mass % or less, it is possible to suppress the oozing of the liquid component during the forming of the electrode material. In addition, in a case where the liquid component contains a solvent, it is possible to suppress the deterioration of battery performance. The lower limit of the content of the liquid component in the electrode material is not limited. The content of the liquid component in the electrode material may be 0 mass % or more, or may exceed 0 mass %.

As the electrode material, for example, the following materials can also be used in addition to the above materials.

(1) The granulated body described in paragraphs 0029 to 0037 of JP2017-104784A
(2) The positive electrode mixture paint described in paragraph 0054 of JP2016-059870A
(3) The composite particles described in paragraphs 0017 to 0070 of JP2016-027573A
(4) The composite particles described in paragraphs 0020 to 0033 of JP6402200B
(5) The electrode composition described in paragraphs 0040 to 0065 of JP2019-046765A
(6) The materials (for example, active material, positive electrode slurry, and negative electrode slurry) described in paragraphs 0080 to 0114 of JP2017-054703A (7) The powder described in JP2014-198293A (8) The active material, binder, and composite particles described in paragraphs 0024 to 0025, 0028, and 0030 to 0032 of JP2016-062654A (Electrode Material Preparation Method)

The electrode material can be prepared by, for example, mixing the electrode active material with the above-described optional components other than the electrode active material. Examples of the mixing method include a method using a ball mill, a beads mill, a planetary mixer, a blade mixer, a roll mill, a kneader, or a disk mill.

<<Supply Step>>

The method of manufacturing a formed body for an electrode according to the present disclosure includes a step of supplying the electrode material to a forming mold which has a frame-shaped side wall portion defining a space portion accommodating the electrode material and has a first support placed on a bottom surface of the forming mold (supply step). The electrode material supplied to the forming mold is placed on the first support in the forming mold.

An example of the supply step will be described with reference to the drawings. For example, as shown in (a) to (c) of FIG. 2, an electrode material 40 is supplied to a forming mold 20 placed on a transport belt 10A. FIG. 3 is a schematic plan view of the forming mold shown in (a) of FIG. 2.

(a) of FIG. 2 shows a forming mold 20 placed on the transport belt 10A.

The transport belt 10A can transport the forming mold 20. The surface of the transport belt 10A also functions as a bottom surface of the forming mold 20.

Although not shown in (a) of FIG. 2, as a belt of a belt conveyor, the transport belt 10A is placed in a ring shape along the outer periphery of a head pulley and a tail pulley placed at both end portions of the belt conveyor.

The forming mold 20 is a mold for forming the electrode material. As shown in FIG. 3, the forming mold 20 is placed in a belt shape (that is, strip shape) in a longitudinal direction of the transport belt 10A. The arrow shown in FIG. 3 represents a transport direction. The arrow shown in FIG. 3 is parallel to the longitudinal direction of the transport belt 10A.

The forming mold 20 is fixed to the transport belt 10A by adsorption. The forming mold 20 may be fixed to the transport belt 10A using an adhesive material.

The forming mold 20 has a frame-shaped side wall portion 20A defining a space portion (recessed portion) accommodating the electrode material. The space portion of the forming mold is defined by the side wall portion 20A of the forming mold 20 and the transport belt 10A.

As shown in FIG. 3, the forming mold 20 is provided with a plurality of space portions. The number of the space portions in the forming mold 20 may be one.

(b) of FIG. 2 shows a first support 30 placed on the bottom surface of the forming mold 20. The first support 30 may be placed in the forming mold 20 at least before the electrode material 40 is supplied to the forming mold 20.

(c) of FIG. 2 shows the electrode material 40 supplied to the forming mold 20. The electrode material 40 supplied to the forming mold 20 is placed on the first support 30.

The supply step may be performed through the steps shown in (a) to (c) of FIG. 4. (a) to (c) of FIG. 4 show the same steps as (a) to (c) of FIG. 2, except that a forming mold 21 having a frame-shaped side wall portion 21A and a bottom portion 21B is used instead of the forming mold 20.

Hereinafter, the supply step will be described in detail.

[Forming Mold]

The forming mold is a mold for forming the electrode material, and has a frame-shaped side wall portion defining a space portion capable of accommodating the electrode material (for example, see (a) of FIG. 2).

In the present disclosure, the "frame shape" means a state in which an inner wall surface is placed along the peripheral edge of the space portion in a case where the forming mold is viewed in a plan view (for example, see FIG. 3).

The shape (refers to the internal shape of the forming mold. This is the same hereinafter.) of the space portion is not limited, and may be determined according to the shape of a target formed body for an electrode. For example, in a case where the electrode material is formed into a flat plate shape, the shape of the space portion is preferably a flat plate shape.

Examples of the shape of the space portion viewed in a plan view include a rectangular shape and a circular shape. For example, in a case where the electrode material is formed into a rectangular shape, the shape of the space portion viewed in a plan view is preferably a rectangular shape.

The width of the space portion viewed in a plan view is not limited, and may be determined according to the width of a target formed body for an electrode. The width of the space portion viewed in a plan view may be appropriately determined in a range of, for example, 50 mm to 2,000 mm.

The length of the space portion viewed in a plan view is not limited, and may be determined according to the length of a target formed body for an electrode. The length of the space portion viewed in a plan view may be appropriately determined in a range of, for example, 100 mm to 2,000 mm.

The height of the space portion is not limited, and may be determined according to the height (that is, thickness) of a target formed body for an electrode. The height of the space portion may be appropriately determined in a range of, for example, more than 0 mm and 5 mm or less.

The forming mold may have one space portion or two or more space portions (for example, see FIG. 3).

The frame-shaped side wall portion can function as a physical constraint for suppressing the uneven distribution of the electrode material supplied to the forming mold. For example, the frame-shaped side wall portion can regulate the movement of the electrode material that causes the non-uniformity of the density distribution of a formed body for an electrode. A formed body for an electrode having excellent formability can be obtained using the forming mold having the frame-shaped side wall portion.

Examples of the material of the side wall portion include resins and metals.

Examples of the metals include stainless steel, copper, and aluminum.

Examples of the resins include a fluororesin, a silicon resin, polypropylene, polyethylene terephthalate, and polyethylene.

The material of the side wall portion is preferably a resin from the viewpoint of an improvement in formability. The material of the side wall portion is preferably a fluororesin or a silicon resin, more preferably polytetrafluoroethylene (PTFE) or a tetrafluoroethylene-ethylene copolymer (ETFE), and particularly preferably polytetrafluoroethylene from the viewpoint of an improvement in releasability of the electrode material, contamination prevention of the forming mold, and an improvement in durability of the forming mold.

The inner peripheral shape of the side wall portion viewed in a plan view is not limited as long as it is a frame shape, and may be determined according to the shape of a target formed body for an electrode. Examples of the inner peripheral shape of the side wall portion viewed in a plan view include a rectangular shape and a circular shape. For example, in a case where the electrode material is formed into a rectangular shape, the inner peripheral shape of the side wall portion viewed in a plan view is preferably a rectangular shape. In other words, the side wall portion preferably has four inner wall surfaces where adjacent surfaces intersect at right angles to each other.

The structure of the side wall portion may be separable or inseparable (for example, integrated structure) as long as a space portion capable of accommodating the electrode material can be defined. In addition, the side wall portion may be composed of a single member or a plurality of members.

The forming mold may have only a side wall portion, or may have a bottom portion in addition to the side wall portion. Specifically, the forming mold may have a bottom portion and a frame-shaped side wall portion defining a space portion capable of accommodating the electrode material (for example, see (a) of FIG. 4).

In a case where the forming mold has a bottom portion, the side wall portion is preferably placed in contact with the bottom portion, and more preferably placed in contact with the bottom portion and in a direction orthogonal to the bottom portion.

In a case where the forming mold has a bottom portion, the bottom portion may be a portion separable from the side wall portion, or a portion inseparable from the side wall portion (for example, a portion integrated with the side wall portion) as long as a space portion capable of accommodating the electrode material can be defined.

Examples of the material of the bottom portion include resins and metals used as a material of the side wall portion. Preferable materials of the bottom portion are the same as the preferable materials of the side wall portion. The material of the bottom portion is preferably the same as the material of the side wall portion.

The shape of the bottom portion is not limited, and may be determined according to, for example, the shape of a target formed body for an electrode. For example, in a case where the electrode material is formed into a flat plate shape, the shape of the bottom portion is preferably a planar shape.

The thickness of the forming mold is not limited, and may be appropriately determined in a range of, for example, 0 mm to 5 mm. The thickness of the forming mold is preferably in a range of 0.01 mm to 2 mm, more preferably in a range of 0.1 mm to 1 mm, and particularly preferably in a range of 0.2 mm to 1.0 mm from the viewpoint of formability and performance depending on the thickness of the product.

The shape of the forming mold is preferably a belt shape (that is, strip shape) (for example, see FIG. 3). In a case where the shape of the forming mold is a belt shape, productivity can be improved. The belt-shaped forming mold preferably has two or more space portions. In a case where the belt-shaped forming mold has two or more space portions, a recessed portion is preferably placed between the space portions. By placing a recessed portion between the space portions, an excess electrode material can be recovered, and thus contamination due to the scattering of the electrode material can be prevented.

The method of manufacturing the forming mold is not limited, and known methods can be used. Examples of the method of manufacturing the forming mold include casting and injection molding. In addition, the forming mold can also be obtained by removing a portion corresponding to the space portion from the base material of the forming mold. The forming mold can also be obtained by bonding and combining a plurality of members to each other.

[First Support]

The first support is placed on the bottom surface of the forming mold. Using the first support, formability can be improved, and moreover, the electrode material can be easily taken out from the forming mold in the take-out step.

In the present disclosure, the "bottom surface of the forming mold" means a surface of a member capable of defining the bottom surface of the space portion in the forming mold. The bottom surface of the forming mold may be a surface of a member independent of the forming mold (specifically, side wall portion), or a surface of a part (for example, bottom portion) of the forming mold as long as the space portion can be defined in the forming mold. That is, in an embodiment of the present disclosure, a surface of a member independent of the forming mold is regarded as the bottom surface of the forming mold as long as the space portion can be defined in the forming mold. For example, as shown in (a) of FIG. 2, the surface of the transport belt 10A which is a member independent of the forming mold 20 is regarded as the bottom surface of the forming mold 20. In addition, for example, as shown in (a) of FIG. 4, a surface of a bottom portion 21B which is a part of the forming mold 21 is the bottom surface of the forming mold 21.

Examples of the first support include release materials. Examples of the release materials include release paper, surface-treated metals (for example, aluminum and stainless steel (generally referred to as "SUS")), films having a coating layer, and paper having a coating layer. The coating layer can be formed by, for example, silicon coating or fluorine coating.

The first support is preferably a release material, and more preferably release paper from the viewpoint of an improvement in releasability of the electrode material.

The shape of the first support is preferably a flat plate shape from the viewpoint of shape followability to the bottom surface of the forming mold and the electrode material.

The average thickness of the first support is preferably 5 µm or more, more preferably 10 µm or more, and particularly preferably 20 µm or more from the viewpoint of shape followability. The average thickness of the first support is preferably 500 µm or less, more preferably 300 µm or less, and particularly preferably 200 µm or less from the viewpoint of flexibility and lightweight property. The average thickness of the first support is an arithmetic average of the thicknesses measured at three points by cross-section observation. In the cross-section observation, known microscopes (for example, a scanning electron microscope) can be used.

The size of the first support is not limited, and may be determined according to the size of the bottom surface of the forming mold. The size of the first support viewed in a plan view is preferably smaller than the size of the bottom surface of the forming mold. In a case where the size of the first support is smaller than the size of the bottom surface of the forming mold, the electrode material can be easily taken out from the forming mold in the take-out step. From the same viewpoint, the ratio of the area of the first support to the area of the bottom surface of the forming mold viewed in a plan view is preferably 99.9% to 90%, more preferably 99.8% to 95%, and particularly preferably 99.5% to 97%.

[Supply Method]

The method of supplying the electrode material to the forming mold is not limited, and known methods can be used. Examples of the method of supplying the electrode material to the forming mold include a method using a supply device.

Examples of the supply device include a screw feeder, a disk feeder, a rotary feeder, and a belt feeder.

Examples of the method of supplying the electrode material to the forming mold also include a method of supplying the electrode material to forming mold by jetting the electrode material from an outlet. In a case where a supply device is used, the electrode material may be jetted from the outlet using the supply device.

In the supply step, the outlet preferably has an on-off mechanism controlling the supply of the electrode material from the viewpoint of preventing contamination due to the scattering of the electrode material. Here, the "on-off mechanism" means a movable mechanism capable of opening and closing a flow passage of the electrode material. Examples of the valve body used for the on-off mechanism include a plate-shaped valve body and a spherical valve body.

In a case where the electrode material is supplied using a supply device, the on-off mechanism is also preferably placed in a flow passage from the supply device to the outlet.

In the supply step, the electrode material is preferably supplied to the forming mold while the outlet and the forming mold are relatively moved. By supplying the electrode material by the above method, the dispersibility of the electrode material in the forming mold can be improved, and thus a formed body for an electrode having excellent formability can be obtained.

In the present disclosure, "relatively moving the outlet and the forming mold" means moving the outlet with respect to the forming mold, moving the forming mold with respect to the outlet, and respectively moving the outlet and the forming mold. In a case where the outlet and the forming mold are respectively moved, the outlet and the forming mold may be respectively moved in, for example, directions that are spaced from each other along the same direction axis. In addition, in a case where the outlet and the forming mold are respectively moved, the outlet and the forming mold may be moved in directions orthogonal to each other. For example, moving the outlet in a width direction (for example, TD: Transverse Direction) of the forming mold and moving the forming mold in a direction (for example, MD: Machine Direction) orthogonal to the width direction of the forming mold can be combined.

In the supply step, the forming mold is preferably moved with respect to the outlet from the viewpoint of an improvement in productivity.

In a case where the forming mold is moved in the supply step, a transport unit for the forming mold is not limited, and known transport units can be used. Examples of the transport unit for the forming mold include a belt conveyor, a linear motion guide, and a cross roller table.

From the viewpoint of stability, the supply of the electrode material is preferably 0.01 kg/min to 100 kg/min, more preferably 0.1 kg/min to 10 kg/min, and particularly preferably 0.5 kg/min to 5 kg/min.

<<Forming Step>>

The method of manufacturing a formed body for an electrode according to the present disclosure includes a step of forming the electrode material along the internal shape of the forming mold (hereinafter, also referred to as "forming step"). In a case where the method of manufacturing a formed body for an electrode according to the present disclosure includes the forming step, the density distribution of the electrode material can be made uniform, and thus a formed body for an electrode having excellent formability can be obtained.

An example of the forming step will be described with reference to the drawings. For example, as shown in (d) of FIG. 2, the electrode material 40 can be formed along the internal shape of the forming mold 20 by pressurizing the electrode material 40 via a second support 50.

In (d) of FIG. 2, for example, by bringing a roll (not shown) as a forming member into contact with the second support 50, the electrode material 40 can be pressurized via the second support 50. The electrode material 40 may be directly pressurized without the use of the second support 50.

(d) of FIG. 4 shows the same step as (d) of FIG. 2, except that the forming mold 21 is used instead of the forming mold 20.

Hereinafter, the forming step will be described in detail.

In the present disclosure, "forming the electrode material along the internal shape of the forming mold" means forming the electrode material into a shape corresponding to the shape of the inner surface of the forming mold, in other words, the shape of the space portion in the forming mold.

The method of forming the electrode material is not limited as long as the electrode material can be formed along the internal shape of the forming mold, and known methods can be used. Examples of the method of forming the electrode material include a method of applying an external force to the electrode material in the forming mold. By applying an external force to the electrode material in the forming mold, the electrode material can be formed along the internal shape of the forming mold.

Specific examples of the method of forming the electrode material include a method of applying a pressure in the depth direction of the electrode material, a method of vibrating the electrode material, and a method of making the surface of the electrode material flat.

In the forming step, the electrode material is preferably formed by bringing the electrode material and the forming member into direct or indirect contact with each other. Here, "bringing the electrode material and the forming member into indirect contact with each other" means bringing the electrode material and the forming member into contact with each other via another member (for example, second support to be described later) placed between the electrode material and the forming member.

The forming member is a member for forming the electrode material. The forming member is not limited as long as the electrode material can be formed along the internal shape of the forming mold. The forming member may be, for example, a part of an apparatus or usable alone. The forming member is preferably a member having a surface that is brought into contact with the electrode material. Here, the "surface that is brought into contact with the electrode material" in a case where the electrode material and the forming member are brought into indirect contact with each other means a surface that is brought into contact with another member placed between the electrode material and the forming member. Examples of the forming member include a roll, a press, a scraper, and a plate-shaped member (for example, squeegee). Among the above examples, the forming member is preferably a roll from the viewpoint of continuity.

The forming member preferably has a vibrating unit. In a case where the forming member has a vibrating unit, formability can be improved. Examples of the vibrating unit include a general vibrator.

The surface of the forming member preferably has an uneven shape. In a case where the surface of the forming member has an uneven shape, formability can be improved.

The forming member may be used alone, or two or more forming members may be used in combination.

In a case where the electrode material is formed using the forming member, the forming member may be brought into contact only with the electrode material or brought into contact with both the electrode material and the forming mold.

In a case where the electrode material is formed using the forming member, the electrode material may be pressurized using the forming member, or the forming member may be moved along the surface of the electrode material while the electrode material and the forming member are brought into contact with each other. The electrode material may be moved while the electrode material and the forming member are brought into contact with each other.

In a case where the electrode material is pressurized using the forming member, the pressure is preferably 1 MPa to 1 GPa, more preferably 5 MPa to 500 MPa, and particularly preferably 10 MPa to 300 MPa.

In a case where the electrode material is formed using the forming member, the electrode material is preferably formed by relatively moving the forming member and the forming mold while bringing the electrode material and the forming member into direct or indirect contact with each other. By forming the electrode material by the above method, a formed body for an electrode having excellent formability can be obtained, and productivity can be improved. In a case where the electrode material is formed by the above method, the electrode material is also preferably pressure-formed.

In the present disclosure, "relatively moving the forming member and the forming mold" includes moving the forming member with respect to the forming mold, moving the forming mold with respect to the forming member, and respectively moving the forming member and the forming mold. The forming mold is preferably moved with respect to the forming member from the viewpoint of an improvement in productivity. In a case where the forming member and the forming mold are respectively moved, the forming member and the forming mold may be respectively moved in directions that are spaced from each other along the same direction axis.

The forming step may be performed while the supply step is performed. That is, in the method of manufacturing a formed body for an electrode according to the present disclosure, the electrode material may be formed along the internal shape of the forming mold while being supplied to the forming mold.

<<Coating Step>>

The method of manufacturing a formed body for an electrode according to the present disclosure preferably includes a step of placing a second support on the electrode material supplied to the forming mold (hereinafter, also referred to as "coating step"). In a case where the method of manufacturing a formed body for an electrode according to the present disclosure includes the coating step, formability can be improved, and moreover, contamination due to the scattering of the electrode material can be prevented.

An example of the coating step will be described with reference to the drawings. For example, in FIG. 1, the coating step may be performed between S120 and S130, between S130 and S140, or at the same time as S130.

For example, as shown in (d) of FIG. 2, the second support 50 can be placed on the electrode material 40 supplied to the forming mold 20.

(d) of FIG. 4 shows the same step as (d) of FIG. 2, except that the forming mold 21 is used instead of the forming mold 20.

Hereinafter, the coating step will be described in detail.

The method of manufacturing a formed body for an electrode according to the present disclosure preferably includes, between the step of supplying the electrode material (supply step) and the step of forming the electrode material (forming step), a step of placing a second support on the electrode material supplied to the forming mold (coating step) from the viewpoint of an improvement in formability and prevention of contamination due to the scattering of the electrode material.

The method of manufacturing a formed body for an electrode according to the present disclosure also preferably includes, between the step of forming the electrode material (forming step) and the step of taking out the electrode material (take-out step), a step of placing a second support on the electrode material supplied to the forming mold (coating step) from the viewpoint of an improvement in formability and prevention of contamination due to the scattering of the electrode material.

It is also preferable that the method of manufacturing a formed body for an electrode according to the present disclosure includes a step of placing a second support on the electrode material supplied to the forming mold (coating step), and the step of placing the second support (coating step) and the step of forming the electrode material (forming step) are simultaneously performed from the viewpoint of an improvement in formability, prevention of contamination due to the scattering of the electrode material, and an improvement in productivity. Here, "simultaneously performing the coating step and the forming step" means that the electrode material is formed along the internal shape of the forming mold while the second support is placed on the electrode material supplied to the forming mold. In the above method, the electrode material can be formed via the second support.

Examples of the material of the second support include resins, metals, and paper.

The second support is preferably a collector. In a case where the second support is a collector, the electrode material can be easily placed on the collector, and moreover, productivity can be improved.

The collector is not limited, and known collectors can be used.

Examples of the positive electrode collector include aluminum, aluminum alloys, stainless steel, nickel, and titanium. The positive electrode collector is preferably aluminum or an aluminum alloy. The positive electrode collector is also preferably aluminum or stainless steel having a coating layer having a surface containing carbon, nickel, titanium, or silver.

Examples of the negative electrode collector include aluminum, copper, copper alloys, stainless steel, nickel, and titanium. The negative electrode collector is preferably aluminum, copper, a copper alloy, or stainless steel, and more preferably copper or a copper alloy. The negative electrode collector is also preferably aluminum, copper, a copper alloy, or stainless steel having a coating layer having a surface containing carbon, nickel, titanium, or silver.

As the collector, aluminum foil or copper foil is preferable. Aluminum foil is usually used as a collector at the positive electrode. Copper foil is usually used as a collector at the negative electrode.

The second support may be meshed or punched. In addition, the second support may be a porous body, a foam, or a formed body of a fiber group. The surface of the second support may have unevenness caused by a surface treatment.

The shape of the second support is preferably a flat plate shape.

The average thickness of the second support is preferably 1 µm to 500 µm, more preferably 3 µm to 300 µm, and particularly preferably 5 µm to 200 µm from the viewpoint of self-supporting property, transportability, and penetration resistance. The average thickness of the second support is an arithmetic average of the thicknesses measured at three points by cross-section observation. In the cross-section observation, known microscopes (for example, a scanning electron microscope) can be used.

<<Displacement Step>>

The method of manufacturing a formed body for an electrode according to the present disclosure preferably includes a step of changing the positional relationship between the first support and the electrode material (hereinafter, also referred to as "displacement step"). In a case where the method of manufacturing a formed body for an electrode according to the present disclosure includes the displacement step, the electrode material can be placed at a position where the electrode material can be easily taken out from the forming mold.

An example of the displacement step will be described with reference to the drawings. For example, in FIG. 1, the displacement step is preferably performed between S130 and S140.

For example, as shown in (e) of FIG. 2, the positional relationship between the first support and the electrode material can be changed by inverting the first support 30 and the electrode material 40 upside down. For example, the first support 30 and the electrode material 40 can be inverted upside down by inverting the transport direction of the transport belt 10A 180 degrees in a U-shape at an end portion of the belt conveyor (not shown).

(e) of FIG. 4 shows the same step as (e) of FIG. 2, except that the forming mold 21 is used instead of the forming mold 20.

Hereinafter, the displacement step will be described in detail.

In the present disclosure, "changing the positional relationship between the first support and the electrode material" means changing the positional relationship between the first support and the electrode material in an optional coordinate system (for example, three-dimensional orthogonal coordinate system).

The method of manufacturing a formed body for an electrode according to the present disclosure preferably includes the displacement step between the step of forming the electrode material (forming step) and the step of taking out the electrode material (take-out step) from the viewpoint of an improvement in formability and an improvement in releasability of the electrode material.

In a case where the method of manufacturing a formed body for an electrode according to the present disclosure includes the coating step, the method of manufacturing a formed body for an electrode according to the present disclosure preferably includes the displacement step between the coating step and the take-out step from the viewpoint of an improvement in formability and an improvement in releasability of the electrode material.

In the displacement step, the electrode material is preferably placed below the first support in the vertical direction by changing the positional relationship between the first support and the electrode material. By placing the electrode material below the first support in the vertical direction, the electrode material can be easily taken out from the forming mold in the take-out step.

In the present disclosure, "placing the electrode material below the first support in the vertical direction" means placing the electrode material below the lower surface of the first support in a cross-sectional view orthogonal to the horizontal plane. In other words, it means that in a case where a virtual line is drawn in the direction (that is, direction of gravitational force) vertical to the first support and the electrode material, the first support and the electrode material are placed at positions where the virtual line extending in the vertical direction passes through the first support and the electrode material in this order. For example, in a case where the downward direction is the vertical direction in (e) of FIG. 2, the electrode material 40 is placed below the first support in the vertical direction. In (e) of FIG. 2, for example, even in the positional relationship in which the first support 30 and the electrode material 40 are rotated in a range of 1 degree to 89 degrees, it can be said that the electrode material 40 is placed below the first support in the vertical direction.

The method of changing the positional relationship between the first support and the electrode material is not limited, and known methods can be used. In a case where the forming mold is placed on the transport member (for example, belt and roll), the positional relationship between the first support and the electrode material can be changed by changing the transport direction of the transport member. In addition, the positional relationship between the first support and the electrode material can be changed by rotating the forming mold.

<<Pressurizing Step>>

The method of manufacturing a formed body for an electrode according to the present disclosure preferably includes a step of pressurizing the electrode material (hereinafter, also referred to as "pressurizing step"). In a case where the method of manufacturing a formed body for an electrode according to the present disclosure includes the pressurizing step, the density distribution of the electrode material can be made more uniform, and thus a formed body for an electrode having excellent formability can be obtained. In addition, the pressurizing step also serves as a consolidation step, so that the density of a formed body for an electrode to be obtained can be increased.

An example of the pressurizing step will be described with reference to the drawings. For example, in FIG. 1, the pressurizing step may be performed between S130 and S140, or after S140.

For example, as shown in (f) of FIG. 2, the electrode material 40 can be pressurized using the transport belt 10A and a transport belt 10B.

In (f) of FIG. 2, the electrode material 40 may be pressurized using a pair of rolls (not shown) instead of the transport belt 10A and the transport belt 10B, or using a roll (not shown) instead of the transport belt 10B.

(f) of FIG. 4 shows the same step as (f) of FIG. 2, except that the forming mold 21 is used instead of the forming mold 20.

Hereinafter, the pressurizing step will be described in detail.

The pressurizing step may be performed before the take-out step or after the take-out step. The method of manufacturing a formed body for an electrode according to the present disclosure preferably includes the pressurizing step between the forming step and the take-out step, or after the take-out step.

In a case where the method of manufacturing a formed body for an electrode according to the present disclosure includes the coating step, the method of manufacturing a formed body for an electrode according to the present disclosure preferably includes the pressurizing step between the coating step and the take-out step.

The method of pressurizing the electrode material is not limited, and known methods can be used. Examples of the method of pressurizing the electrode material include a method using a pressurizing member.

Examples of the pressurizing member include rolls, belts, and presses.

The pressurizing member may be used alone, or two or more pressurizing members may be used in combination. In the pressurizing step, for example, a pair of rolls may be used, a roll and a belt may be used in combination, or two belts may be used.

In the pressurizing step, the electrode material is preferably pressurized in a stepwise manner using a plurality of rolls. By pressurizing the electrode material in a stepwise manner using a plurality of rolls, the density distribution of the electrode material can be made more uniform, and thus a formed body for an electrode having excellent formability can be obtained. For example, using a plurality of rolls in which a gap between the rolls is adjusted to be narrower in a stepwise manner, the electrode material can be pressurized in a stepwise manner.

The pressure is preferably 1 MPa to 1 GPa, more preferably 5 MPa to 500 MPa, and particularly preferably 10 MPa to 300 MPa.

In the pressurizing step, the electrode material is preferably pressurized under heating conditions from the viewpoint of an improvement in formability.

<<Take-Out Step>>

The method of manufacturing a formed body for an electrode according to the present disclosure includes a step of taking out the electrode material from the forming mold (hereinafter, also referred to as a "take-out step").

An example of the take-out step will be described with reference to the drawings. For example, as shown in (g) of FIG. 2, a formed body for an electrode 60 can be obtained by taking out the electrode material from the forming mold 20.

As shown in (g) of FIG. 2, the transport belt 10B can be used as a member (receiving member to be described later) that receives the electrode material taken out from the forming mold 20.

For example, in (f) of FIG. 2, the electrode material 40 may be pressurized in the direction of the transport belt 10A. In (f) of FIG. 2, the electrode material may be adsorbed in the direction of the transport belt 10B. By the above-described methods, the transport belt 10A and the first support 30 can be easily spaced from each other, and thus the electrode material can be easily taken out from the forming mold.

(g) of FIG. 4 shows the same step as (g) of FIG. 2, except that the electrode material is taken out from the forming mold 21 instead of the forming mold 20.

Hereinafter, the take-out step will be described in detail.

In the present disclosure, "taking out the electrode material from the forming mold" means that the forming mold and the electrode material are separated from each other to obtain the electrode material, and is not limited to taking the electrode material accommodated in the forming mold out of the forming mold. For example, in the take-out step, the electrode material may be separated from the forming mold, or the forming mold may be separated from the electrode material. The method of taking out the electrode material from the forming mold is not limited, and known methods can be used. Examples of the method of taking out the electrode material from the forming mold include a method using the weight of the electrode material itself, a method of extruding the electrode material, and a method using a tool (for example, spatula). In addition, the electrode material may be taken out from the forming mold by disassembling the forming mold.

Examples of the method of extruding the electrode material include a method of extruding the electrode material by sending air to the forming mold.

In the take-out step, the electrode material is preferably taken out from the forming mold in a direction in which the electrode material is placed based on the first support. By the above-described method, the electrode material can be easily taken out. Here, "taking out the electrode material from the forming mold in a direction in which the electrode material is placed based on the first support" is not limited to taking out the electrode material only. In a case where the second support is used in the method of manufacturing a formed body for an electrode according to the present disclosure, taking out the electrode material and the second support is included.

In the take-out step, the electrode material and the first support are preferably taken out from the forming mold. By taking out the electrode material and the first support from the forming mold, the releasability of the electrode material can be improved, and since the surface of the electrode material can be protected in the course of taking out the electrode material, a formed body for an electrode having excellent formability can be obtained. In a case where the second support is used in the method of manufacturing a formed body for an electrode according to the present disclosure, the electrode material, the first support, and the second support are preferably taken out from the forming mold.

In a case where the electrode material and the first support are taken out from the forming mold, the first support after the take-out step may be used as a protective body or so-called interleaving paper in the cutting of the second support. In addition, the first support may be appropriately peeled off after the take-out step.

In the take-out step, the electrode material is preferably taken out from the forming mold, and placed on a receiving member. By placing the electrode material on the receiving member, the scattering of the electrode material can be prevented, and a formed body for an electrode having excellent formability can be obtained. Here, "placing the electrode material on the receiving member" is not limited to placing the electrode material in contact with the receiving member. In a case where the second support is used in the method of manufacturing a formed body for an electrode according to the present disclosure, placing the second support and the electrode material in this order on the receiving member is included.

The receiving member is not limited as long as it is a member on which the electrode material taken out from the forming mold can be placed. Examples of the receiving member include resin films, metal foil, and metal plates. In addition, for example, as shown in (g) of FIG. 2 and (g) of FIG. 4, the transport member can also be used as a receiving member.

In the take-out step, the electrode material is also preferably taken out from the forming mold by sucking or adsorbing the electrode material (referred to as the second support in a case where the second support is used) to the receiving member. By the above-described method, the electrode material can be easily taken out from the forming mold. Here, "sucking or adsorbing the electrode material to the receiving member" is not limited to directly sucking or adsorbing the electrode material to the receiving member. In a case where the second support is used in the method of manufacturing a formed body for an electrode according to the present disclosure, indirectly sucking or adsorbing the electrode material to the receiving member via the second support is included.

In the take-out step, it is preferable that the electrode material is extruded in a direction in which the electrode material is placed based on the first support, or the electrode material is taken out from the forming mold by sucking or adsorbing the electrode material to the receiving member, and it is more preferable that the electrode material is extruded in a direction in which the electrode material is placed based on the first support, and the electrode material is taken out from the forming mold by sucking or adsorbing the electrode material to the receiving member.

<<Transport Method>>

In the method of manufacturing a formed body for an electrode according to the present disclosure, examples of the method of transporting the forming mold include a method using a transport member. For example, by placing the forming mold on the transport member, the above steps can be performed while the forming mold is transported.

In the method of manufacturing a formed body for an electrode according to the present disclosure, the forming mold is preferably placed on the transport member. Productivity can be improved by performing the above steps using the forming mold placed on the transport member. In a case where the forming mold placed on the transport member is used, a formed body for an electrode can be obtained by performing the above steps along the transport direction.

Examples of the transport member include a belt and a roll.

The transport member may be used alone, or two or more transport members may be used in combination.

<<Formed Body for Electrode>>

A formed body for an electrode obtained by the method of manufacturing a formed body for an electrode according to the present disclosure has excellent formability, and can thus be used as various electrodes. The formed body for an electrode is preferably a formed body for an electrode for an all-solid state secondary battery.

The shape of the formed body for an electrode is not limited, and may be appropriately determined depending on the intended use. The shape of the formed body for an electrode is preferably a flat plate shape.

The average thickness of the formed body for an electrode is preferably 0.01 mm to 2 mm, more preferably 0.05 mm to 1.5 mm, and particularly preferably 0.1 mm to 1 mm from the viewpoint of an improvement in battery performance (for example, discharge capacity and output characteristics). The average thickness of the formed body for an electrode is an arithmetic average of the thicknesses measured at three points by cross-section observation. In the cross-section observation, known microscopes (for example, a scanning electron microscope) can be used.

EXAMPLES

Hereinafter, the present disclosure will be described in detail with examples, but is not limited thereto.

<Preparation of Sulfide-Based Inorganic Solid Electrolyte (Li—P—S-Based Glass)>

A sulfide-based inorganic solid electrolyte was prepared with reference to "T. Ohtomo, A. Hayashi, M. Tatsumisago, Y. Tsuchida, S. Hama, K. Kawamoto, Journal of Power Sources, 233, (2013), pp. 231 to 235, and A. Hayashi, S. Hama, H. Morimoto, M. Tatsumisago, T. Minami, Chem. Lett., (2001), pp 872 to 873".

Specifically, in a glove box under an argon atmosphere (dew point: −70° C.), 2.42 g of lithium sulfide ($Li_2S$, manufactured by Sigma-Aldrich Inc., purity: >99.98%) and 3.9 g of diphosphorus pentasulfide ($P_2S_5$, manufactured by Sigma-Aldrich Inc., purity: >99%) were respectively weighed, and then the lithium sulfide and the diphosphorus pentasulfide were mixed for 5 minutes using an agate mortar. The molar ratio of $Li_2S$ to $P_2S_5$ ($Li_2S:P_2S_5$) was 75:25.

66 zirconia beads having a diameter of 5 mm were put in a 45 mL zirconia container (manufactured by Fritsch GmbH). Then, the entire amount of the mixture of the lithium sulfide and the diphosphorus pentasulfide was put therein, and then the container was completely sealed under an argon atmosphere. The container was mounted on a planetary ball mill P-7 (trade name) manufactured by Fritsch GmbH, and mechanical milling was performed for 20 hours at a temperature of 25° C. and a rotation speed of 510 rpm (revolutions per minute) to obtain 6.2 g of a yellow powder of a sulfide solid electrolyte material (Li—P—S-based glass). The above steps were repeated 10 times, and 62 g of a solid electrolyte material was obtained.

Example 1

[Preparation of Electrode Material (P-1) for Positive Electrode]

180 zirconia beads having a diameter of 5 mm were put in a 45 mL zirconia container (manufactured by Fritsch GmbH), and then 3.0 g of the prepared Li—P—S-based glass was put therein. The container was mounted on a planetary ball mill P-7 manufactured by Fritsch GmbH, and mixing was performed for 2 hours at a temperature of 25° C. and a rotation speed of 300 rpm. Next, 6.8 g of LCO ($LiCoO_2$, manufactured by Nippon Chemical Industrial CO., LTD.) as an active material and Li-100 (0.2 g) manufactured by Denka Company as a conductive auxiliary agent were put in the container. Then, the container was mounted on the planetary ball mill P-7, and mixing was performed for 10 minutes at a temperature of 25° C. and a rotation speed of 100 rpm to obtain an electrode material (P-1) for a positive electrode. The above steps were repeated 10 times, and a required amount of an electrode material for the positive electrode was obtained.

[Preparation of Electrode Material (N-1) for Negative Electrode]

180 zirconia beads having a diameter of 5 mm were put in a 45 mL zirconia container (manufactured by Fritsch GmbH), and then 4.0 g of the prepared Li—P—S-based glass was put therein. The container was mounted on a planetary ball mill P-7 manufactured by Fritsch GmbH, and mixing was performed for 2 hours at a temperature of 25° C. and a rotation speed of 300 rpm. Next, 5.0 g of CGB20 (trade name, manufactured by Nippon Graphite Industries, Co., Ltd.) as an active material and 1.0 g of the prepared conductive auxiliary agent were put in the container. Then, the container was mounted on the planetary ball mill P-7, and mixing was performed for 15 minutes at a temperature of 25° C. and a rotation speed of 200 rpm to obtain an electrode material (N-1) for a negative electrode. The above steps were repeated 10 times, and a required amount of an electrode material for the negative electrode was obtained.

[Production of Positive Electrode Sheet]

The electrode material (P-1) for a positive electrode was put into a powder receiving port of a screw feeder (powder measuring feeder (screw type) manufactured by AS ONE Corporation, PSF-100SA) (S210 in FIG. 5). Next, release paper (first support) previously cut to have a size of 44.9 mm×49.9 mm was placed in a fluororesin frame belt (forming mold, thickness: 1.0 mm, inside dimension of hollow frame (hereinafter, simply referred to as "frame"): 45 mm×50 mm) wound around a porous stainless steel belt conveyor capable of adsorption. The release paper is adsorbed on the belt conveyor by decompression.

While the frame belt was transported using the belt conveyor, the screw feeder was operated, and the electrode material (P-1) for a positive electrode was supplied to the frame of the frame belt so as to have a thickness of 0.6 mm (S220 in FIG. 5).

Aluminum foil (second support, collector) having a thickness of 20 μm was placed on the frame belt. Then, using a stainless roll of ϕ90 mm and a rubber roll made of nitrile butadiene rubber (NBR), the electrode material (P-1) for a positive electrode was pressed and leveled via the aluminum foil, and thus the electrode material (P-1) for a positive electrode was compacted in the frame without clearance (S230 and S240 in FIG. 5).

By inverting the transport direction 180 degrees in a U-shape at an end portion of the belt conveyor, the release paper and the electrode material (P-1) for a positive electrode were inverted upside down (S250 in FIG. 5). During the course of inversion, the electrode material (P-1) for a positive electrode was transported while being nipped from an upper surface to a lower surface of the belt conveyor.

After the inversion, compressed air was blown from the inside of the belt conveyor, and the release paper was extruded from the frame to extrude the flat plate-shaped electrode material (P-1) for a positive electrode on the aluminum foil (S260 in FIG. 5).

The excess aluminum foil was cut off with a Thomson blade, and then the electrode material was pressed for 1 minute at 10 MPa. Thus, a positive electrode sheet (formed body for electrode) was obtained (S270 in FIG. 5). The positive electrode sheet has a layer structure of the positive electrode layer and the aluminum foil.

[Production of Negative Electrode Sheet]

A negative electrode sheet (formed body for electrode) was produced by the same method as the positive electrode sheet, except that the electrode material (P-1) for a positive electrode was changed to the electrode material (N-1) for a negative electrode, and the aluminum foil (second support, collector) was changed to copper foil (second support, collector) having a thickness of 20 μm. The negative electrode sheet has a layer structure of the negative electrode layer and the copper foil.

[Production of Solid Electrolyte Sheet]

180 zirconia beads having a diameter of 5 mm were put in a 45 mL zirconia container (manufactured by Fritsch GmbH), and then 1.0 g of the prepared Li—P—S-based glass and 1.5 g of isobutyronitrile were put therein. The container was mounted on a planetary ball mill P-7 manufactured by Fritsch GmbH, and stirring was performed for 2 hours at a temperature of 25° C. and a rotation speed of 300 rpm to obtain a solid electrolyte composition. The obtained solid electrolyte composition was applied onto 20 μm aluminum foil using an applicator. Then, the composition was dried for 1 hour at 80° C., and then dried for 1 hour at 120° C. to obtain a solid electrolyte sheet. The solid electrolyte sheet has a layer structure of the solid electrolyte layer and the aluminum foil. After the solid electrolyte layer was sufficiently solidified, only the solid electrolyte layer was taken out by peeling off the aluminum foil. The thickness of the solid electrolyte layer was 30 μm.

[Production of All-Solid State Secondary Battery]

The solid electrolyte layer was placed to face the negative electrode layer in the negative electrode sheet, and pressed for 1 minute at 10 MPa. Thus, a negative electrode sheet with a solid electrolyte was produced.

The positive electrode sheet and the negative electrode sheet with a solid electrolyte were placed so that the positive electrode layer in the positive electrode sheet and the solid electrolyte layer in the negative electrode sheet with a solid electrolyte face each other in a stainless steel case with an optional size having a spacer and a washer. By the above operation, an all-solid state secondary battery was obtained. The obtained all-solid state secondary battery has a layer structure of the copper foil, the negative electrode layer, the solid electrolyte layer, the positive electrode layer, and the aluminum foil.

Example 2

A lithium hexafluorophosphate solution (1.0 M $LiPF_6$ in EC/EMC=50/50 (v/v)) manufactured by Sigma-Aldrich Inc. was used as an electrolytic solution. "EC" means ethylene carbonate. "EMC" means ethyl methyl carbonate.

A positive electrode sheet, a negative electrode sheet, a solid electrolyte sheet, and an all-solid state secondary battery were produced, respectively, by the same method as in Example 1, except that as the electrode material for a positive electrode, an electrode material (P-2) for a positive electrode prepared by kneading the electrode material (P-1) for a positive electrode and an electrolytic solution (amount added: corresponding to 10 mass % with respect to the total mass of the electrode material (P-2) for a positive electrode to be obtained) was used, and as the electrode material for a negative electrode, an electrode material (N-2) for a negative electrode prepared by kneading the electrode material (N-1) for a negative electrode and an electrolytic solution (amount added: corresponding to 25 mass % with respect to the total mass of the electrode material (N-2) for a negative electrode to be obtained) was used.

Comparative Example 1

A positive electrode sheet, a negative electrode sheet, a solid electrolyte sheet, and an all-solid state secondary battery were produced, respectively, by the same method as in Example 1, except that in the manufacturing of the positive electrode sheet and the negative electrode sheet, the forming was performed by cutting the end portion using a Thomson blade without the use of the fluororesin frame belt (forming mold).

<Evaluation>

[Mass Distribution of Electrode Layer]

A variation (σ) in mass of the positive electrode layer in the positive electrode sheet was evaluated by measuring the mass of the positive electrode sheets (20 sheets) cut into 1 cm squares using an electronic balance. A variation (σ) in mass of the negative electrode layer in the negative electrode sheet was evaluated by the same method as described above. The evaluation results are shown in Table 1. The smaller the value of the variation (σ), the better the formability.

TABLE 1

| | | Positive Electrode Sheet | | | Negative Electrode Sheet | | |
|---|---|---|---|---|---|---|---|
| | Forming Mold | Electrode Material Kind | Content of Electrolytic Solution [mass %] | Mass Distribution (σ) of Positive Electrode Layer [%] | Electrode Material Kind | Content of Electrolytic Solution [mass %] | Mass Distribution (σ) of Negative Electrode Layer [%] |
| Example 1 | Frame Belt | P-1 | 0 | 2.3 | N-1 | 0 | 2.3 |
| Example 2 | Frame Belt | P-2 | 10 | 2.4 | N-2 | 25 | 2.8 |
| Comparative Example 1 | — | P-1 | 0 | 7 | N-1 | 0 | 8 |

In the column of "Forming Mold" in Table 1, "-" means that no forming mold is used.

From Table 1, it has been found that the variation in mass distribution of the positive electrode layer and in mass distribution of the negative electrode layer was smaller in Examples 1 and 2 than in Comparative Example 1. This result shows that the formability is more excellent in Examples 1 and 2 than in Comparative Example 1.

The entire disclosure of JP2019-122367 filed on Jun. 28, 2019 is incorporated herein by reference. All literatures, patent applications, and technical standards described herein are incorporated herein by reference to the same extent as if each literature, patent application, or technical standard is specifically and individually indicated as being incorporated by reference.

What is claimed is:

1. A method of manufacturing a formed body for an electrode comprising in order:
   preparing an electrode material containing an electrode active material;
   supplying the electrode material to a forming mold which has a frame-shaped side wall portion defining a space portion accommodating the electrode material and has a first support placed on a bottom surface of the forming mold;
   forming the electrode material along an internal shape of the forming mold; and
   taking out the electrode material from the forming mold,
   wherein the first support is a release material.

2. The method of manufacturing a formed body for an electrode according to claim 1,
   wherein in the forming the electrode material, the electrode material and a forming member are brought into direct or indirect contact with each other to form the electrode material.

3. The method of manufacturing a formed body for an electrode according to claim 1, further comprising:
   placing a second support on the electrode material supplied to the forming mold between the supplying the electrode material and the forming the electrode material.

4. The method of manufacturing a formed body for an electrode according to claim 1, further comprising:
   placing a second support on the electrode material supplied to the forming mold between the forming the electrode material and the taking out the electrode material.

5. The method of manufacturing a formed body for an electrode according to claim 1, further comprising:
   placing a second support on the electrode material supplied to the forming mold,
   wherein the placing the second support and the forming the electrode material are simultaneously performed.

6. The method of manufacturing a formed body for an electrode according to claim 3,
   wherein the second support is a collector.

7. The method of manufacturing a formed body for an electrode according to claim 1, further comprising:
   placing the electrode material below the first support in a vertical direction by changing a positional relationship between the first support and the electrode material between the forming the electrode material and the taking out the electrode material.

8. The method of manufacturing a formed body for an electrode according to claim 1,
   wherein in the taking out the electrode material, the electrode material and the first support are taken out from the forming mold.

9. The method of manufacturing a formed body for an electrode according to claim 1, further comprising:
   pressurizing the electrode material between the forming the electrode material and the taking out the electrode material, or after the taking out the electrode material.

10. The method of manufacturing a formed body for an electrode according to claim 9,
    wherein in the pressurizing the electrode material, the electrode material is pressurized in a stepwise manner using a plurality of rolls.

11. The method of manufacturing a formed body for an electrode according to claim 1,
    wherein the electrode material is supplied to the forming mold by jetting the electrode material from an outlet having an on-off mechanism controlling the supply of the electrode material.

12. The method of manufacturing a formed body for an electrode according to claim 11,
    wherein the electrode material is supplied to the forming mold while the outlet and the forming mold are relatively moved.

13. The method of manufacturing a formed body for an electrode according to claim 1,
    wherein a content of a liquid component in the electrode material is 30 mass % or less with respect to a total mass of the electrode material.

14. The method of manufacturing a formed body for an electrode according to claim 1,
    wherein the electrode material contains a conductive auxiliary agent.

15. A method of manufacturing a formed body for an electrode comprising in order:
- preparing an electrode material containing an electrode active material;
- supplying the electrode material to a forming mold which has a frame-shaped side wall portion defining a space portion accommodating the electrode material and has a first support placed on a bottom surface of the forming mold;
- placing a second support on the electrode material supplied to the forming mold;
- forming the electrode material along an internal shape of the forming mold; and
- taking out the electrode material from the forming mold, wherein the second support is a collector.

16. The method of manufacturing a formed body for an electrode according to claim 15, further comprising:
- placing the electrode material below the first support in a vertical direction by changing a positional relationship between the first support and the electrode material between the forming the electrode material and the taking out the electrode material.

17. The method of manufacturing a formed body for an electrode according to claim 15,
- pressurizing the electrode material between the forming the electrode material and the taking out the electrode material, or after the taking out the electrode material.

18. A method of manufacturing a formed body for an electrode comprising in order:
- preparing an electrode material containing an electrode active material;
- supplying the electrode material to a forming mold which has a frame-shaped side wall portion defining a space portion accommodating the electrode material and has a first support placed on a bottom surface of the forming mold;
- forming the electrode material along an internal shape of the forming mold;
- placing a second support on the electrode material supplied to the forming mold; and
- taking out the electrode material from the forming mold.

19. The method of manufacturing a formed body for an electrode according to claim 18, further comprising:
- placing the electrode material below the first support in a vertical direction by changing a positional relationship between the first support and the electrode material between the forming the electrode material and the taking out the electrode material.

20. The method of manufacturing a formed body for an electrode according to claim 18,
- pressurizing the electrode material between the forming the electrode material and the taking out the electrode material, or after the taking out the electrode material.

* * * * *